United States Patent
Xu et al.

(10) Patent No.: US 12,047,158 B2
(45) Date of Patent: Jul. 23, 2024

(54) SATELLITE COMMUNICATION METHOD AND RELATED COMMUNICATION DEVICE

(71) Applicant: HUAWEI TECHNOLOGIES CO., LTD., Guangdong (CN)

(72) Inventors: Chenlei Xu, Hangzhou (CN); Jianwei Zhou, Hangzhou (CN); Hejia Luo, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 17/707,558

(22) Filed: Mar. 29, 2022

(65) Prior Publication Data
US 2022/0224404 A1 Jul. 14, 2022

Related U.S. Application Data

(63) Continuation of application No. PCT/CN2020/119610, filed on Sep. 30, 2020.

(30) Foreign Application Priority Data

Sep. 30, 2019 (CN) .......................... 201910945929.4

(51) Int. Cl.
*H04B 7/185* (2006.01)
*H04L 27/26* (2006.01)
(Continued)

(52) U.S. Cl.
CPC ..... *H04B 7/18513* (2013.01); *H04L 27/2607* (2013.01); *H04W 74/0833* (2013.01)

(58) Field of Classification Search
CPC ............ H04B 7/18513; H04B 7/18563; H04B 7/18582; H04L 27/2607; H04L 27/2613;
(Continued)

(56) References Cited

U.S. PATENT DOCUMENTS

2016/0119887 A1 4/2016 Charipadi et al.
2017/0055297 A1 2/2017 Da et al.
(Continued)

FOREIGN PATENT DOCUMENTS

CN 102036408 A 4/2011
CN 103988565 A 8/2014
(Continued)

OTHER PUBLICATIONS

Longfei Wei et al. ("Time domain cascade correlation Timing Advance estimation method in LTE-A super coverage" XP032527909; Oct. 2013 (Year: 2013).*

(Continued)

*Primary Examiner* — Melvin C Marcelo
*Assistant Examiner* — Natali Pascual Peguero
(74) *Attorney, Agent, or Firm* — Fish & Richardson P.C.

(57) ABSTRACT

The disclosure provides satellite communication methods and related devices. One example method includes generating a random access preamble sequence which includes a cyclic prefix, a sequence part, and a guard interval. The sequence part includes a subsequence A and a subsequence B, or the sequence part includes a subsequence C, and the subsequence C is a time domain superimposed sequence of a subsequence A and a subsequence B. The subsequence A includes at least one preamble symbol, the subsequence B includes at least one preamble symbol, and the subsequence A and the subsequence B are respectively generated by using ZC sequences of different root indexes, a quantity of subsequences A is m, a quantity of subsequences B is m or m−1, and m is a positive integer. The method further includes outputting the random access preamble sequence.

20 Claims, 18 Drawing Sheets

(51) Int. Cl.
*H04W 74/08* (2024.01)
*H04W 74/0833* (2024.01)

(58) Field of Classification Search
CPC ............. H04L 27/2657; H04L 27/2666; H04L 27/2692; H04W 56/0045; H04W 74/0833
See application file for complete search history.

(56) References Cited

U.S. PATENT DOCUMENTS

| | | |
|---|---|---|
| 2018/0070381 A1 | 3/2018 | Lei et al. |
| 2021/0111939 A1 | 4/2021 | Ren et al. |

FOREIGN PATENT DOCUMENTS

| | | |
|---|---|---|
| CN | 104053244 A | 9/2014 |
| CN | 105474725 A | 4/2016 |
| CN | 108289021 A | 7/2018 |
| CN | 108683482 A | 10/2018 |
| CN | 109104387 A | 12/2018 |
| CN | 109150769 A | 1/2019 |
| CN | 109874168 A | 6/2019 |
| CN | 110178333 A | 8/2019 |
| WO | 2018177160 A1 | 10/2018 |

OTHER PUBLICATIONS

Wei et al., "Time-Domain-Cascade-Correlation Timing Advance Estimation Method in LTE—A Super Coverage," IEEE Xplore, Oct. 24-26, 2013, 6 pages.
CATT, "Further Consideration on NR RACH Preamble Sequence and Preamble Format for Capacity Enhancement," 3GPP TSG RAN WG1 Meeting NR#3, R1-1715789, Nagoya, Japan, Sep. 18-21, 2017, 28 pages.
Extended European Search Report in European Appln No. 20871544. 1, dated Oct. 13, 2022, 12 pages.
Office Action issued in Chinese Application No. 201910945929.4 on Aug. 18, 2021, 21 pages (with English translation).
Office Action issued in Chinese Application No. 201910945929.4 on Feb. 18, 2022, 6 pages (with English translation).
PCT International Search Report and Written Opinion issued in International Application No. PCT/CN2020/119610 on Dec. 30, 2020, 15 pages (with English translation).
Samsung, "Considerations on PRACH design in high-mobility scenario," 3GPP TSG RAN WG1 Meeting #90, R1-1713566, Prague, Czechia, Aug. 21-25, 2017, 5 pages.

\* cited by examiner

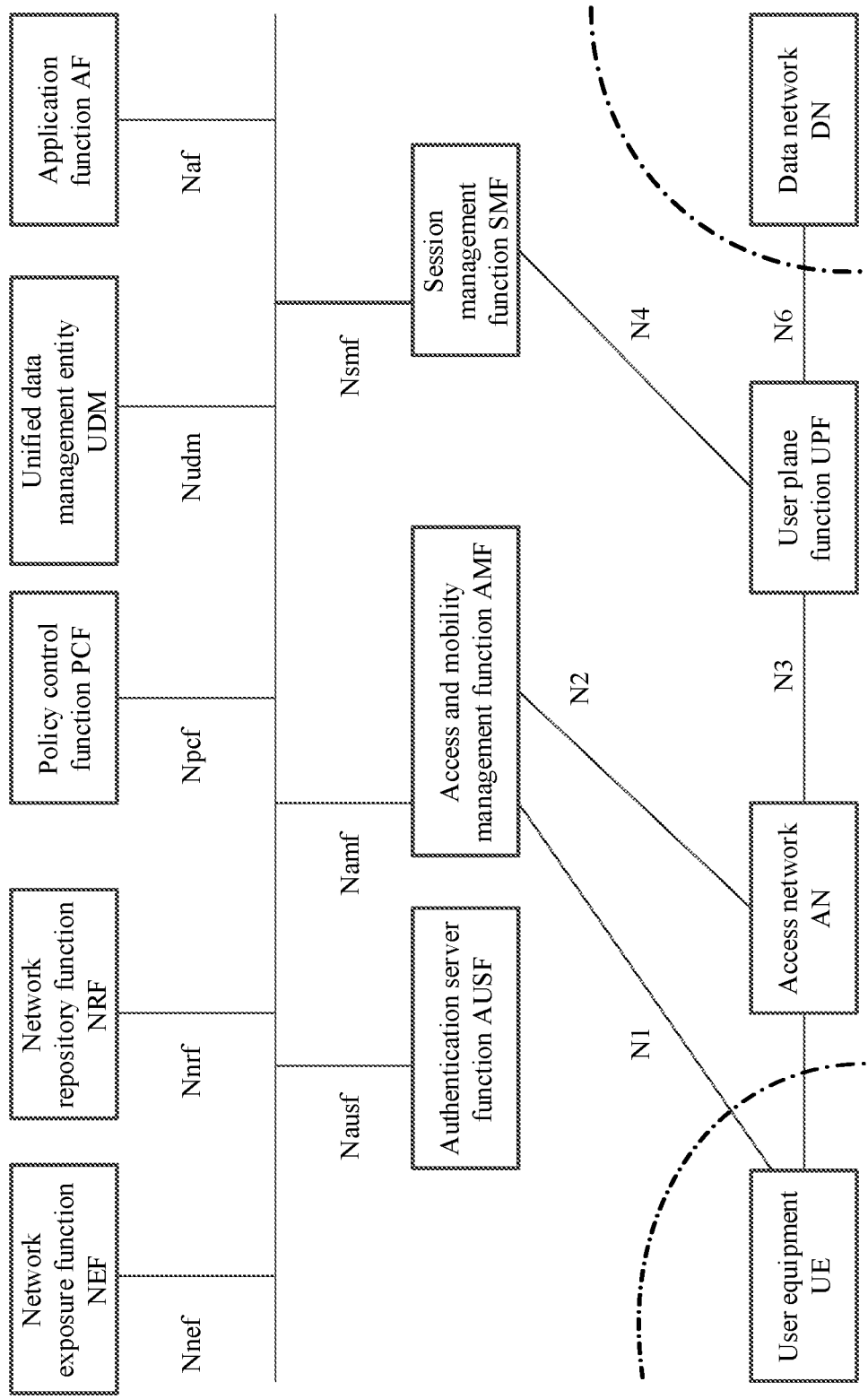
FIG. 1-A

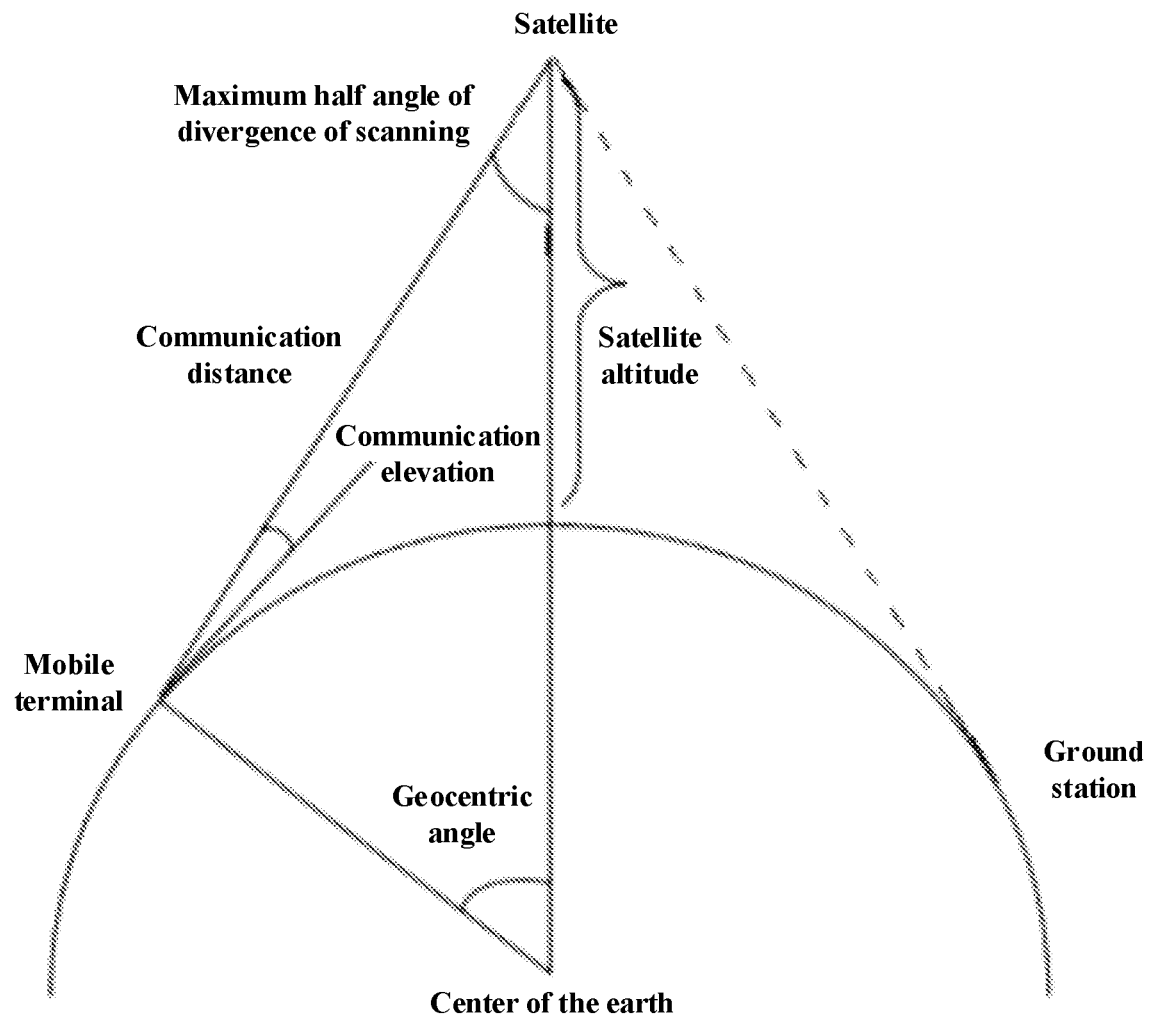
FIG. 1-B

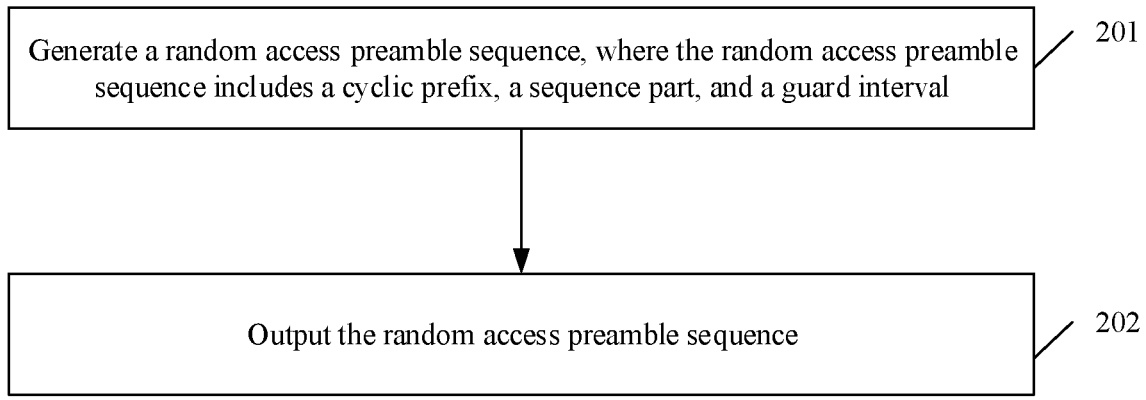
FIG. 2
FIG. 3-A
FIG. 3-B
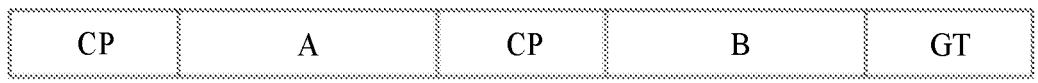
FIG. 3-C
FIG. 3-D
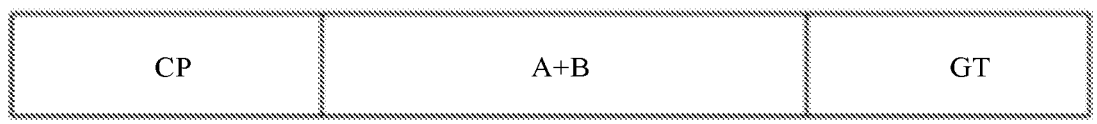
FIG. 3-E

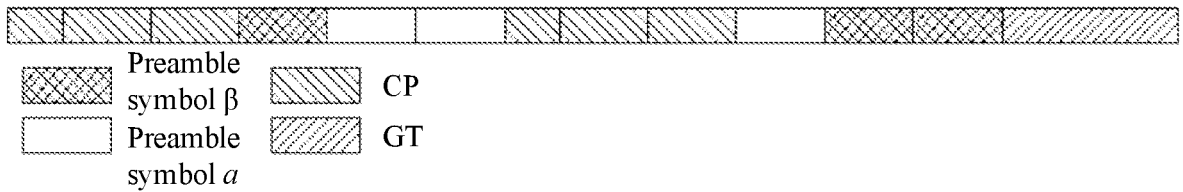
FIG. 3-F
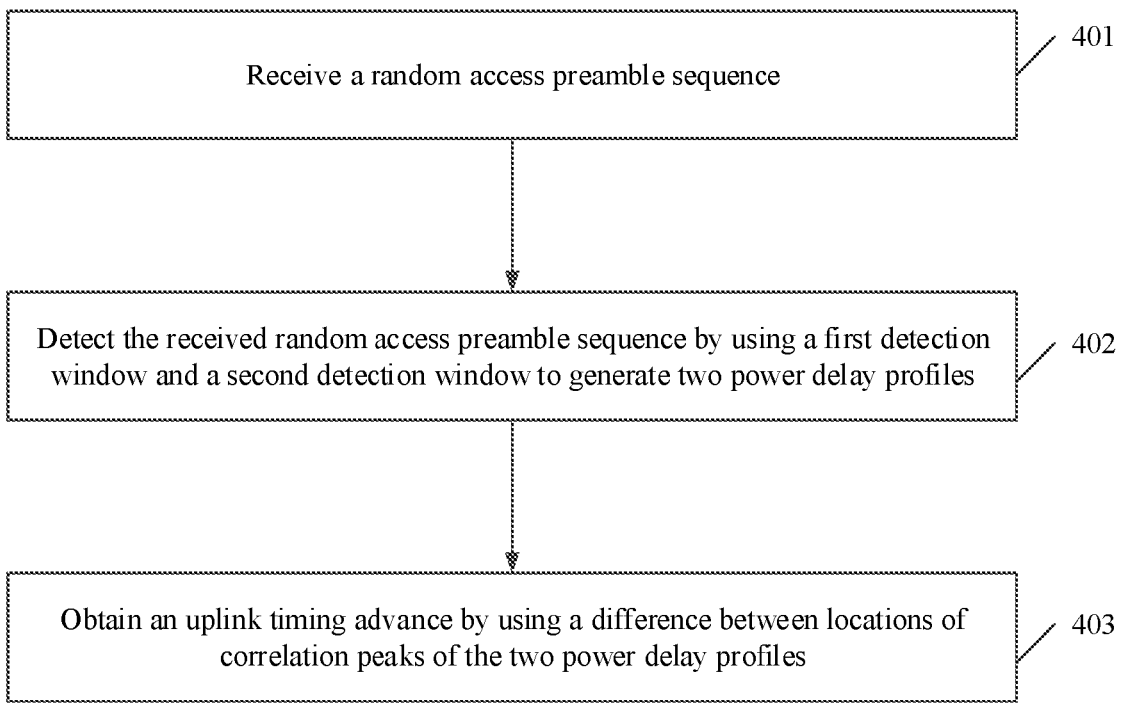
FIG. 4
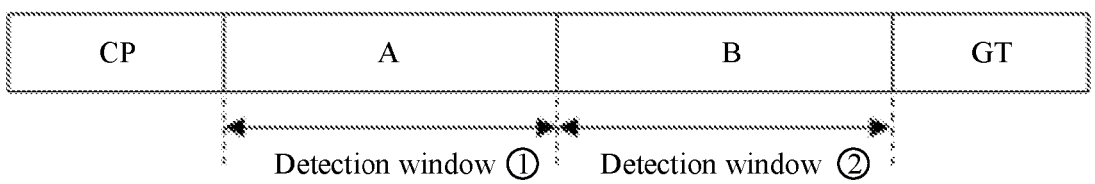
FIG. 5-A

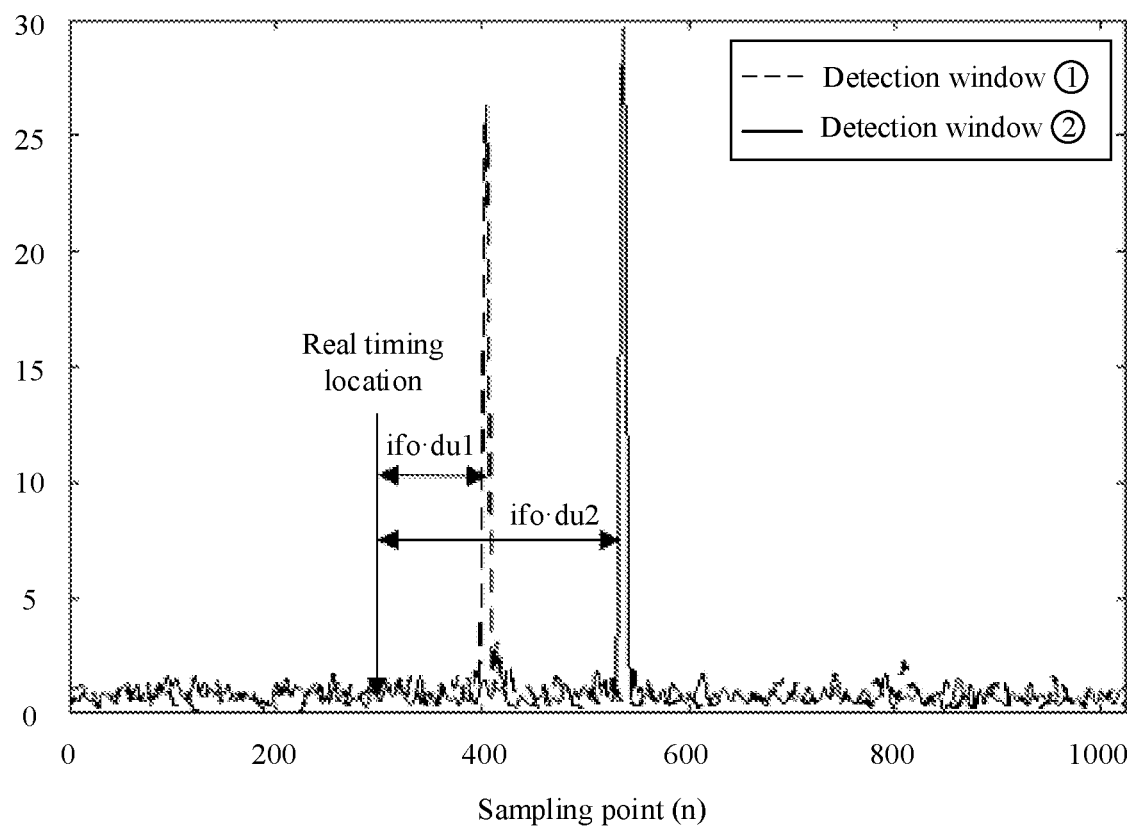
FIG. 5-B

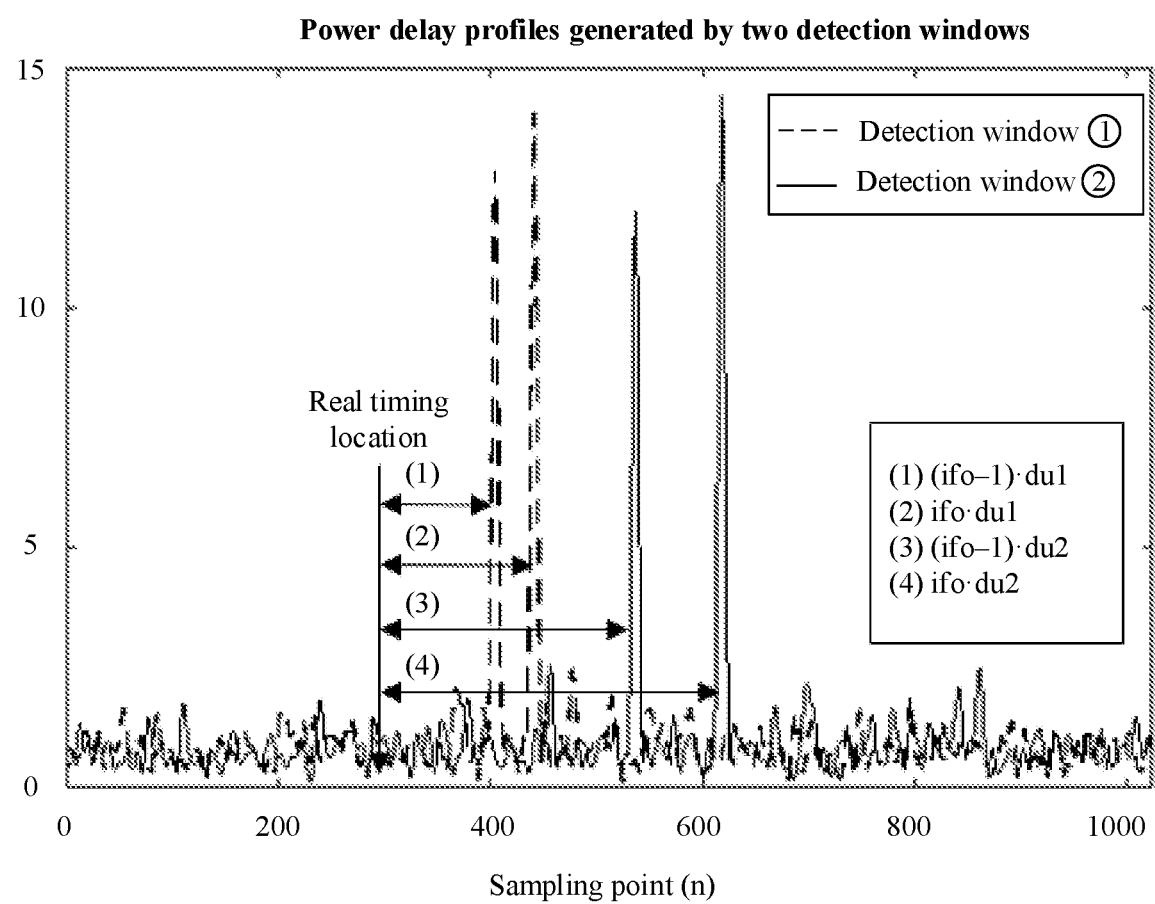
FIG. 5-C

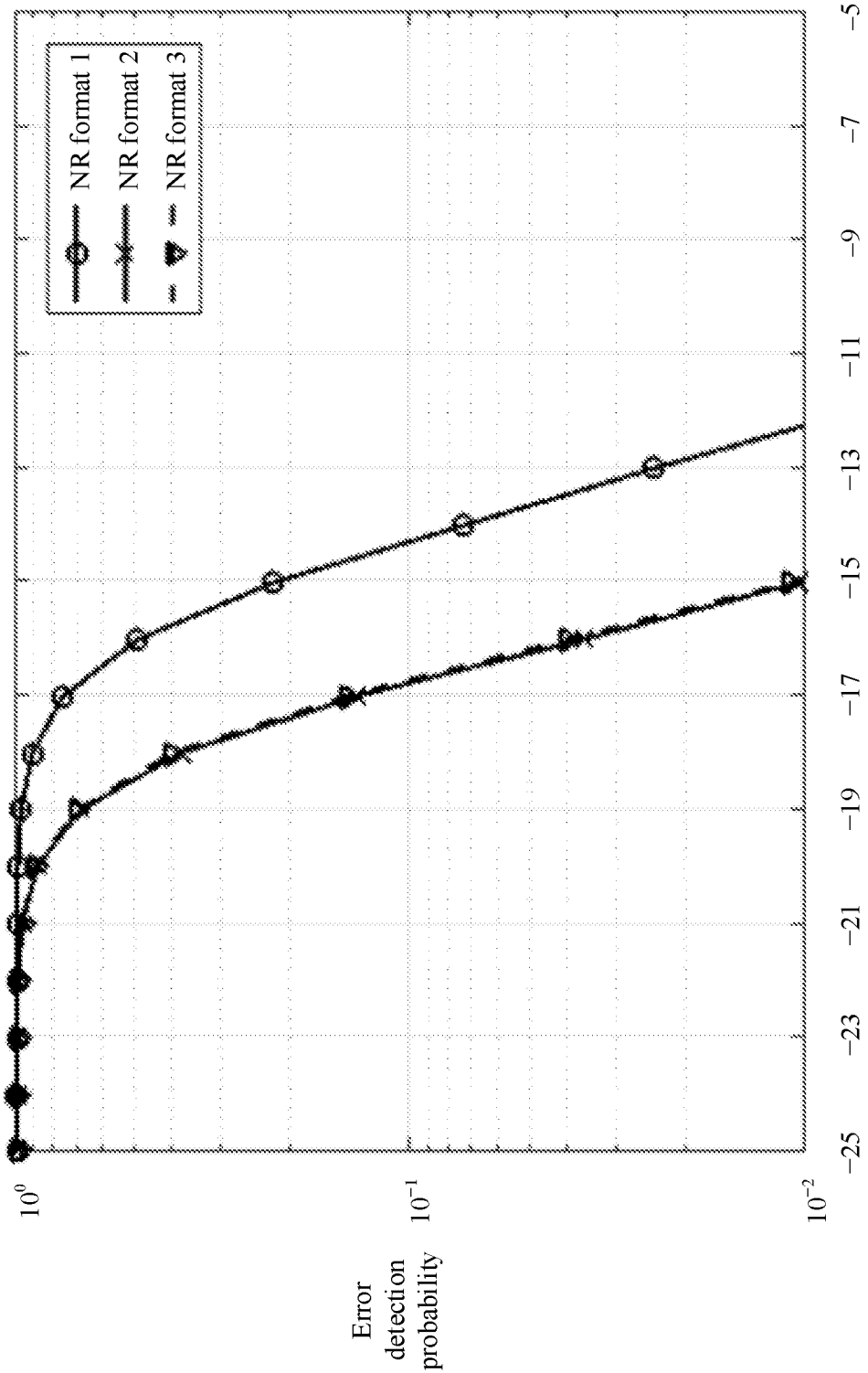
FIG. 6-A

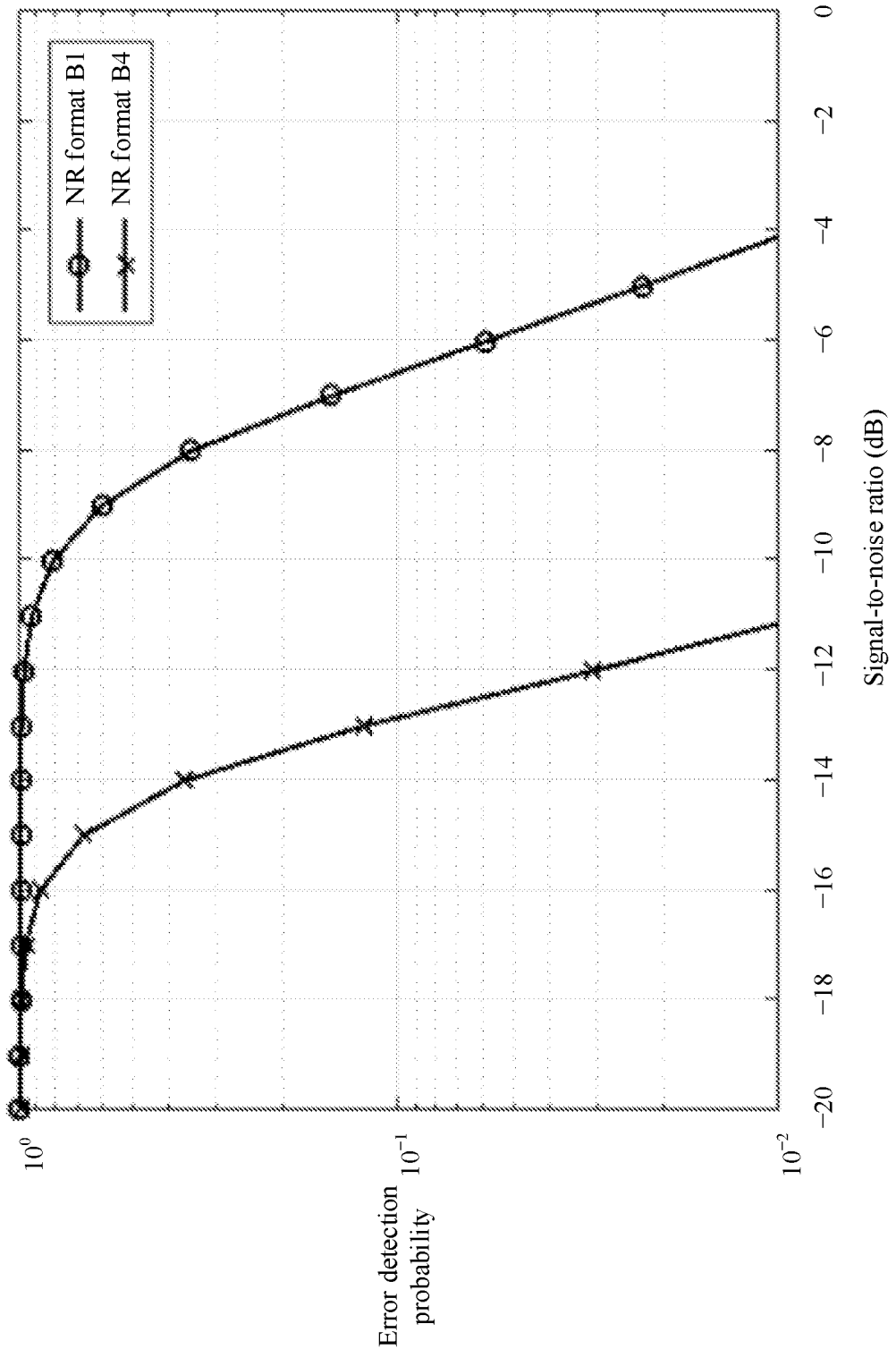
FIG. 6-B

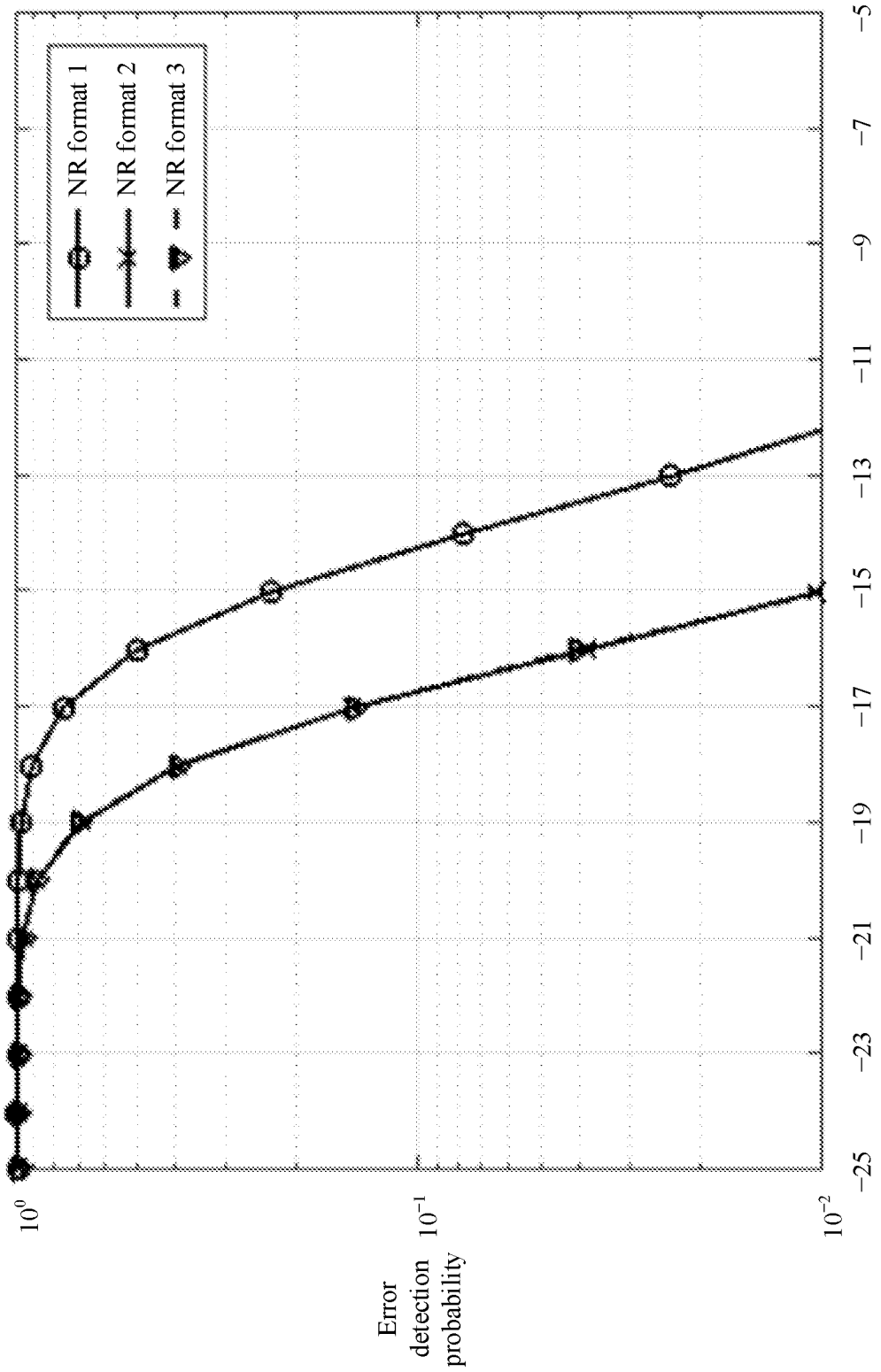
FIG. 6-C

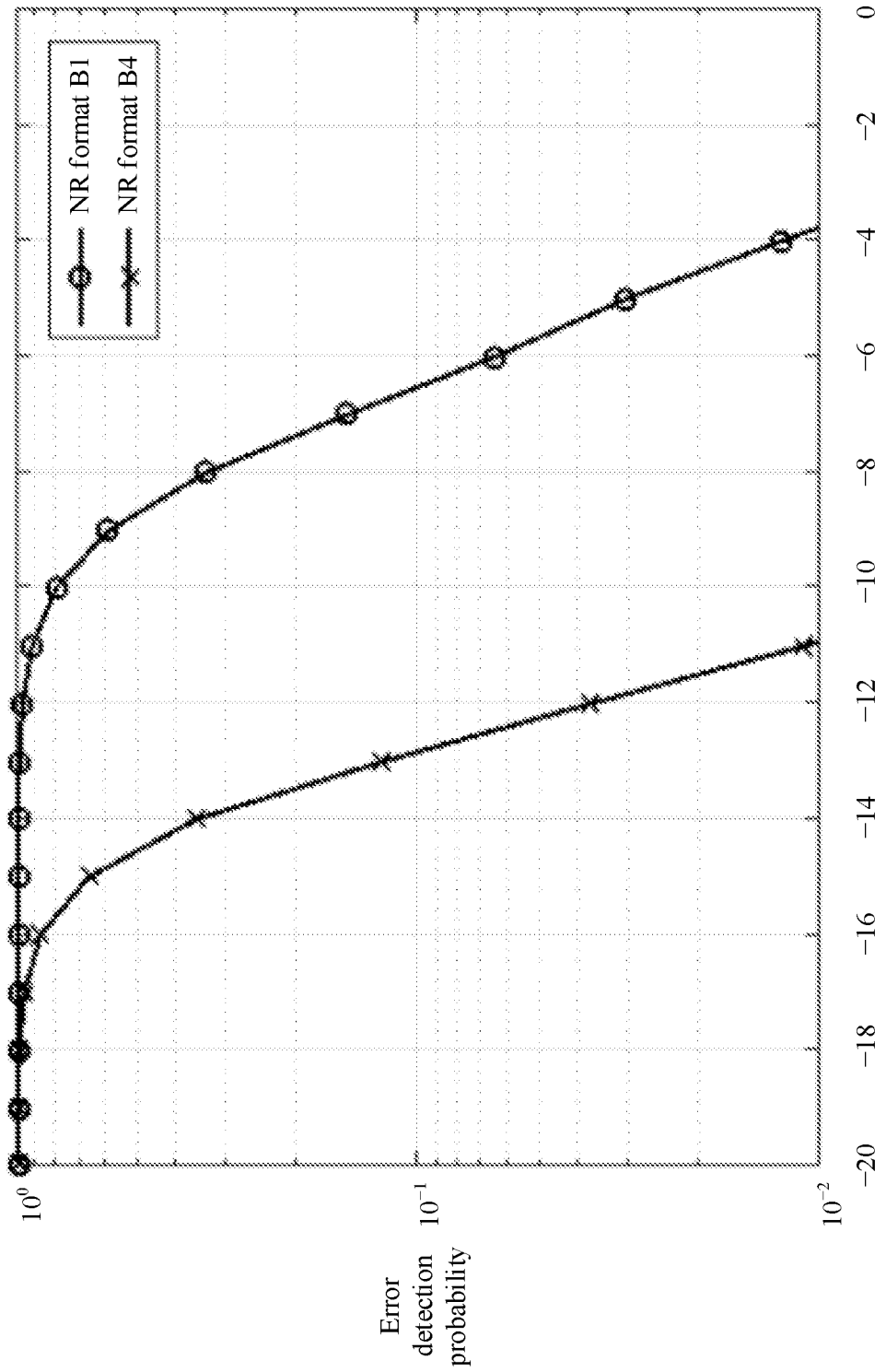
FIG. 6-D

| Group | Subgroup | Logical root index | Physical root index |
|---|---|---|---|
| Low cubic metric group | 1 | 0 to 27 | 710, 129, 691, 148, 120, 719, 210, 629, 140, 699, 84, 755, 168, 671, 105, 734, 60, 779, 70, 769, 56, 783, 42, 797, 1, 838, 40, 799 |
| | 2 | 28 to 55 | 21, 818, 20, 819, 24, 815, 30, 809, 28, 811, 35, 804, 800, 39, 796, 43, 771, 68, 73, 766, 765, 74, 137, 702, 178, 661, 688, 151 |
| | 3 | 56 to 83 | 217, 622, 142, 697, 128, 711, 203, 636, 202, 637, 118, 721, 89, 750, 95, 744, 778, 61, 784, 55, 802, 37, 15, 824, 14, 825, 12, 827 |
| | 4 | 84 to 111 | 10, 829, 23, 816, 53, 786, 805, 34, 66, 773, 173, 666, 179, 660, 638, 201, 694, 145, 704, 135, 706, 133, 696, 143, 130, 709, 228, 611 |
| | 5 | 112 to 139 | 621, 218, 698, 141, 718, 121, 191, 648, 184, 655, 108, 731, 101, 738, 735, 104, 71, 768, 59, 780, 64, 775, 826, 13, 8, 831, 7, 832 |
| | 6 | 140 to 167 | 6, 833, 822, 17, 49, 790, 789, 50, 65, 774, 757, 82, 758, 81, 751, 88, 670, 169, 752, 87, 720, 119, 705, 134, 695, 144, 152, 687 |
| | 7 | 168 to 195 | 215, 624, 138, 701, 153, 686, 154, 685, 700, 139, 628, 211, 682, 157, 199, 640, 158, 681, 652, 187, 664, 175, 668, 171, 170, 669, 5, 834 |
| | 8 | 196 to 223 | 33, 806, 743, 96, 75, 764, 97, 742, 673, 166, 172, 667, 676, 163, 200, 639, 650, 189, 114, 725, 657, 182, 156, 683, 123, 716, 627, 212 |

| | | |
|---|---|---|
| 9 | 224 to 251 | 614, 225, 615, 224, 619, 220, 618, 221, 712, 127, 634, 205, 633, 206, 160, 679, 653, 186, 58, 781, 672, 167, 62, 777, 4, 835, 54, 785 |
| 10 | 252 to 279 | 821, 18, 32, 807, 787, 52, 92, 747, 94, 745, 102, 737, 680, 159, 730, 109, 641, 198, 662, 177, 196, 643, 155, 684, 214, 625, 692, 147 |
| 11 | 280 to 307 | 613, 226, 713, 126, 131, 708, 620, 219, 659, 180, 630, 209, 111, 728, 76, 763, 767, 72, 794, 45, 22, 817, 19, 820, 3, 836, 798, 41 |
| 12 | 308 to 335 | 814, 25, 801, 38, 36, 803, 795, 44, 772, 67, 63, 776, 90, 749, 674, 165, 635, 204, 651, 188, 113, 726, 722, 117, 656, 183, 617, 222 |
| 13 | 336 to 363 | 213, 626, 715, 124, 195, 644, 192, 647, 724, 115, 193, 646, 723, 116, 185, 654, 79, 760, 85, 754, 77, 762, 69, 770, 788, 51, 828, 11 |
| 14 | 364 to 391 | 26, 813, 792, 47, 99, 740, 741, 98, 100, 739, 174, 665, 732, 107, 164, 675, 208, 631, 176, 663, 645, 194, 162, 677, 642, 197, 689, 150 |
| 15 | 292 to 419 | 227, 612, 223, 616, 623, 216, 690, 149, 707, 132, 161, 678, 207, 632, 733, 106, 756, 83, 748, 91, 57, 782, 793, 46, 823, 16, 9, 830 |
| 16 | 420 to 455 | 837, 2, 27, 812, 31, 808, 791, 48, 810, 29, 93, 746, 103, 736, 78, 761, 86, 753, 759, 80, 110, 729, 727, 112, 649, 190, 714, 125, 658, 181, 122, 717, 693, 146, 136, 703 |

FIG. 7-A

| Group | Subgroup | Logical root index | Physical root index |
|---|---|---|---|
| High cubic metric group | 1 | 456 to 479 | 610, 229, 604, 235, 258, 581, 599, 240, 565, 274, 279, 560, 296, 543, 532, 307, 309, 530, 483, 356, 522, 317, 503, 336 |
| | 2 | 480 to 503 | 325, 514, 493, 346, 508, 331, 481, 353, 290, 549, 555, 284, 583, 256, 253, 586, 270, 569, 576, 263, 579, 260, 238, 601 |
| | 3 | 504 to 527 | 231, 608, 245, 594, 588, 251, 436, 403, 282, 557, 468, 371, 457, 382, 301, 538, 342, 497, 499, 340, 338, 501, 341, 498 |
| | 4 | 528 to 551 | 332, 507, 326, 513, 350, 489, 496, 343, 314, 525, 474, 365, 364, 475, 422, 417, 593, 246, 596, 243, 278, 561, 600, 239 |
| | 5 | 552 to 575 | 562, 277, 411, 428, 410, 429, 442, 397, 440, 399, 379, 460, 544, 295, 529, 310, 527, 312, 354, 485, 334, 505, 519, 320 |
| | 6 | 576 to 599 | 335, 504, 360, 479, 524, 315, 453, 386, 452, 387, 554, 285, 444, 395, 376, 463, 252, 587, 418, 421, 577, 262, 232, 607 |
| | 7 | 600 to 623 | 230, 609, 423, 416, 413, 426, 283, 556, 449, 390, 363, 476, 455, 384, 388, 451, 478, 361, 511, 328, 502, 337, 515, 324 |
| | 8 | 624 to 647 | 349, 490, 385, 454, 548, 291, 470, 369, 380, 459, 377, 462, 432, 407, 425, 414, 568, 271, 567, 272, 264, 575, 259, 580 |

| 9 | 648 to 671 | 244, 595, 589, 250, 247, 592, 558, 281, 381, 458, 547, 292, 477, 362, 359, 480, 313, 526, 327, 512, 323, 516, 506, 333 |
|---|---|---|
| 10 | 672 to 695 | 322, 517, 348, 491, 319, 520, 352, 487, 353, 486, 541, 298, 540, 299, 539, 300, 446, 393, 445, 394, 602, 237, 564, 275 |
| 11 | 696 to 719 | 605, 234, 269, 570, 566, 273, 249, 590, 591, 248, 464, 375, 431, 408, 370, 469, 401, 438, 473, 366, 347, 492, 509, 330 |
| 12 | 720 to 743 | 518, 321, 521, 318, 494, 345, 528, 311, 297, 542, 545, 294, 389, 450, 392, 447, 443, 396, 427, 412, 585, 254, 257, 582 |
| 13 | 744 to 767 | 241, 598, 255, 584, 415, 424, 467, 372, 461, 378, 400, 439, 391, 448, 289, 550, 306, 533, 344, 495, 488, 351, 316, 523 |
| 14 | 768 to 791 | 339, 500, 308, 531, 293, 546, 304, 535, 551, 288, 398, 441, 368, 471, 430, 409, 465, 374, 276, 563, 597, 242, 571, 268 |
| 15 | 792 to 815 | 236, 603, 578, 261, 573, 266, 406, 433, 437, 402, 434, 405, 552, 287, 553, 286, 303, 536, 456, 383, 510, 329, 482, 357 |
| 16 | 816 to 837 | 355, 484, 534, 305, 537, 302, 472, 367, 404, 435, 373, 466, 280, 559, 265, 574, 420, 419, 267, 572, 606, 233 |

FIG. 7-B

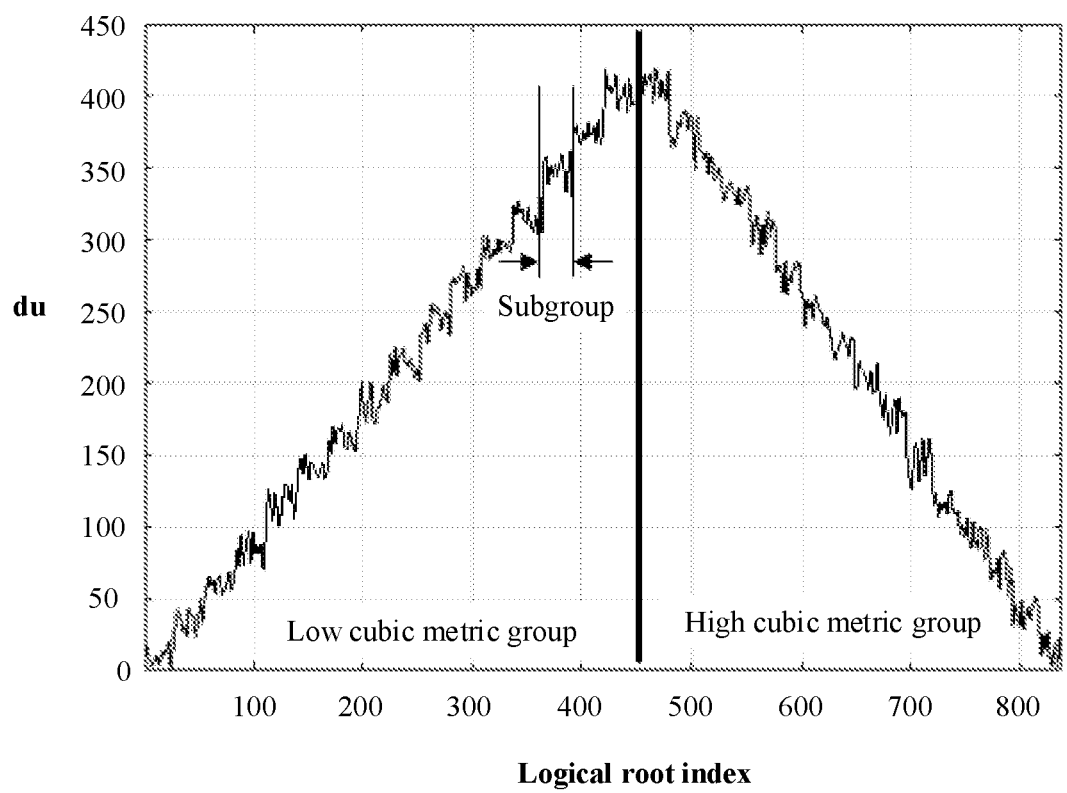
FIG. 8-A

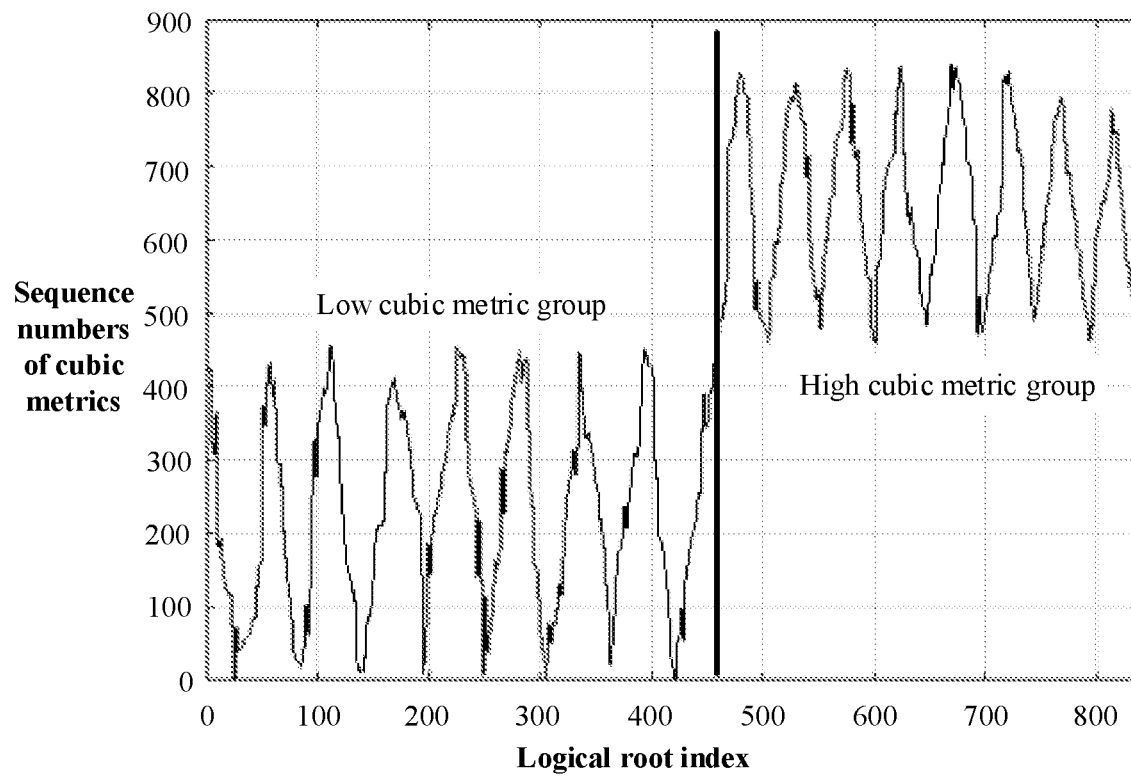
FIG. 8-B
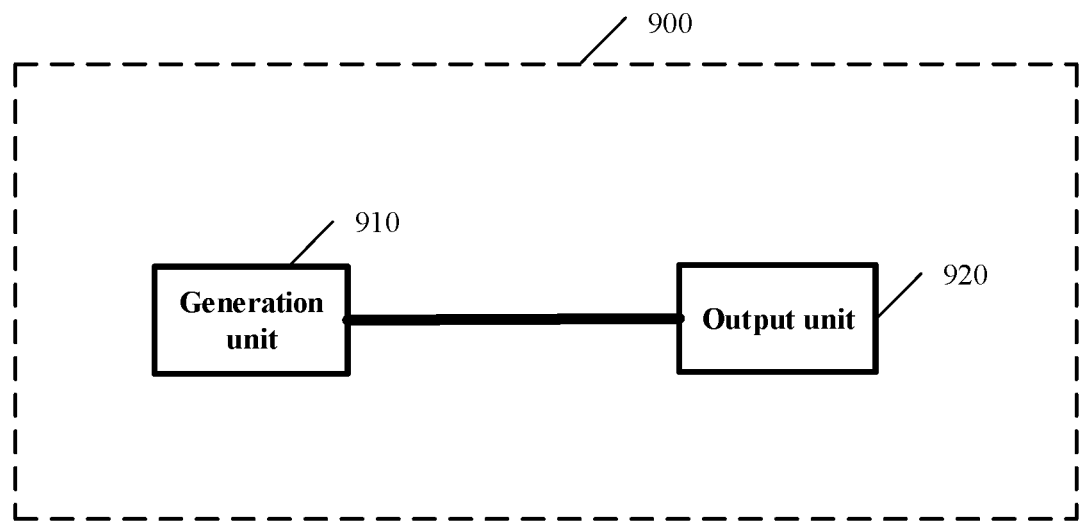
FIG. 9

SATELLITE COMMUNICATION METHOD AND RELATED COMMUNICATION DEVICE

CROSS-REFERENCE TO RELATED APPLICATIONS

This application is a continuation of International Application No. PCT/CN2020/119610, filed on Sep. 30, 2020, which claims priority to Chinese Patent Application No. 201910945929.4, filed on Sep. 30, 2019. The disclosures of the aforementioned applications are hereby incorporated by reference in their entireties.

TECHNICAL FIELD

This application relates to the field of communication technologies, and in particular, to a satellite communication method and a related communication device.

BACKGROUND

Satellite communication has significant advantages such as global coverage, long-distance transmission, flexible networking, convenient deployment, and free from a geographical condition. Therefore, satellite communication has been widely applied to a plurality of fields such as maritime communication, positioning and navigation, disaster relief against risks, scientific experiments, video broadcasting, and earth observation.

In the future, the ground fifth-generation (5G) mobile network will have a complete industry chain, a large user group, a flexible and efficient application service mode, and the like. Therefore, an important direction for communication development in the future is as follows: A satellite communication system and the 5G network are mutually integrated and learn from each other, to jointly form a global integrated communication network seamlessly covering sea, land, air, and space, to meet a plurality of ubiquitous service requirements of users.

The satellite communication system uses a non-geostationary earth orbit (NGEO) satellite. Based on orbital heights of satellites, satellite mobile communication systems may be specifically classified into geostationary earth orbit (GEO) systems, medium earth orbit (MEO) satellite communication systems, and low earth orbit (LEO) satellite communication systems.

Regardless of a ground cellular mobile communication system or a satellite mobile communication system, a carrier frequency offset greatly deteriorates operating performance of the communication system. A main source of the carrier frequency offset is: an error between frequencies of crystal oscillators used at a transmit end and a receive end of the communication system and a Doppler frequency offset of a wireless channel.

For the ground mobile communication system, the carrier frequency offset mainly comes from a crystal oscillator error. In a high-speed mobile communication scenario, for example, a high-speed train or an airplane, the Doppler frequency offset is also an important part of the carrier frequency offset. For the satellite mobile communication system, especially a low earth orbit satellite mobile communication system, in addition to the carrier frequency offset caused by the crystal oscillator error, a large Doppler frequency offset further exists in a satellite-to-ground link.

However, certainly, a mature and reliable related solution that may be used to better resolve the carrier frequency offset in the satellite mobile communication system has not been designed in the industry.

SUMMARY

Embodiments of this application provide a satellite communication method and a related communication device.

According to a first aspect, an embodiment of this application provides a satellite communication method, including:

generating a random access preamble sequence, where the random access preamble sequence includes a cyclic prefix, a sequence part, and a guard interval;

the sequence part includes a subsequence A and a subsequence B, or the sequence part includes a subsequence C, and the subsequence C is a time domain superimposed sequence of a subsequence A and a subsequence B; and the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer; and outputting the random access preamble sequence.

It can be learned that in the solution of this embodiment of this application, a random access preamble sequence that includes a plurality of preamble symbols and that has an anti-frequency offset capability is designed, and the random access preamble sequence includes preamble symbols generated by using different ZC sequences. It is found in a test that the random access preamble sequence has a good anti-frequency offset capability.

A length of each subsequence A and a length of each subsequence B may be separately greater than or equal to a length of the cyclic prefix.

In some possible implementations, the random access preamble sequence includes one cyclic prefix. The subsequence A and the subsequence B are located between the cyclic prefix and the guard interval, or the subsequence C is located between the cyclic prefix and the guard interval.

In some other possible implementations, the random access preamble sequence includes a first cyclic prefix and a second cyclic prefix. At least one subsequence A is located between the first cyclic prefix and the second cyclic prefix, and at least one subsequence B is located between the second cyclic prefix and the guard interval.

Alternatively, at least one subsequence B is located between the first cyclic prefix and the second cyclic prefix, and at least one subsequence A is located between the second cyclic prefix and the guard interval.

Alternatively, at least one subsequence C is located between the first cyclic prefix and the second cyclic prefix, and at least one subsequence C is located between the second cyclic prefix and the guard interval.

Alternatively, at least one subsequence A and at least one subsequence B alternately occur between the first cyclic prefix and the second cyclic prefix.

A specific format for generating the random access preamble sequence is not limited to the foregoing examples, and another format that meets a requirement may be further designed based on the requirement.

In some possible implementations, before the generating a random access preamble sequence, the method further includes: receiving a root index indication, where the root index indication is used to determine the root indexes of the ZC sequences used to generate the subsequence A and/or the subsequence B. The root index indication may specifically determine, in various manners, the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1 = f(i)$, $u_2 = g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1 = f(i_1)$, $u_2 = f(i_2)$, and $f(\cdot)$ represents a mapping relationship that is between a logical root index and a physical root index and that is recorded in a mapping table.

Alternatively, the root index indication includes a first logical root index $i_1$ that can be used by the root index $u_1$, $u_1 = f(i_1)$, $u_2 = f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{zc} - u_1) = f(i_1 + 1)$, $u_1 = f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

According to a second aspect, an embodiment of this application provides a satellite communication device, including:
    a generation unit, configured to generate a random access preamble sequence, where the random access preamble sequence includes a cyclic prefix, a sequence part, and a guard interval;
    the sequence part includes a subsequence A and a subsequence B, or the sequence part includes a subsequence C, and the subsequence C is a time domain superimposed sequence of a subsequence A and a subsequence B; and
    the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer; and
    an output unit, configured to output the random access preamble sequence.

It can be learned that in the solution of this embodiment of this application, a random access preamble sequence that includes a plurality of preamble symbols and that has an anti-frequency offset capability is designed, and the random access preamble sequence includes preamble symbols generated by using different ZC sequences. It is found in a test that the random access preamble sequence has a good anti-frequency offset capability.

A length of each subsequence A and a length of each subsequence B may be separately greater than or equal to a length of the cyclic prefix.

In some possible implementations, the random access preamble sequence includes one cyclic prefix. The subsequence A and the subsequence B are located between the cyclic prefix and the guard interval, or the subsequence C is located between the cyclic prefix and the guard interval.

In some other possible implementations, the random access preamble sequence includes a first cyclic prefix and a second cyclic prefix. At least one subsequence A is located between the first cyclic prefix and the second cyclic prefix, and at least one subsequence B is located between the second cyclic prefix and the guard interval.

Alternatively, at least one subsequence B is located between the first cyclic prefix and the second cyclic prefix, and at least one subsequence A is located between the second cyclic prefix and the guard interval.

Alternatively, at least one subsequence C is located between the first cyclic prefix and the second cyclic prefix, and at least one subsequence C is located between the second cyclic prefix and the guard interval.

Alternatively, at least one subsequence A and at least one subsequence B alternately occur between the first cyclic prefix and the second cyclic prefix.

A specific format for generating the random access preamble sequence is not limited to the foregoing examples, and another format that meets a requirement may be further designed based on the requirement.

In some possible implementations, the receiving unit is configured to: receive a root index indication before the generation unit generates the random access preamble sequence, where the root index indication is used to determine the root indexes of the ZC sequences used to generate the subsequence A and/or the subsequence B. The generation unit may determine, based on the root index indication, the root indexes of the ZC sequences used to generate the subsequence A and/or the subsequence B.

The root index indication may specifically determine, in various manners, the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1 = f(i)$, $u_2 = g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1 = f(i_1)$, $u_2 = f(i_2)$, and $f(\ )$ represents a mapping relationship that is between a logical root index and a physical root index and that is recorded in a mapping table.

Alternatively, the root index indication includes a first logical root index $i_1$ that can be used by the root index $u_1$, $u_1=f(i_1)$, $u_2=f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{zc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

According to a third aspect, an embodiment of this application further provides a satellite communication method, including:

receiving a random access preamble sequence; detecting the received random access preamble sequence by using a first detection window and a second detection window to generate two power delay profiles; and obtaining an uplink timing advance by using a difference between locations of correlation peaks of the two power delay profiles.

The random access preamble sequence includes a cyclic prefix, a sequence part, and a guard interval; the sequence part includes a subsequence A and a subsequence B, or the sequence part includes a subsequence C, and the subsequence C is a time domain superimposed sequence of a subsequence A and a subsequence B; and the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer.

A length of each subsequence A and a length of each subsequence B may be separately greater than or equal to a length of the cyclic prefix.

In some possible implementations, the random access preamble sequence includes one cyclic prefix. The subsequence A and the subsequence B are located between the cyclic prefix and the guard interval, or the subsequence C is located between the cyclic prefix and the guard interval.

In some other possible implementations, the random access preamble sequence includes a first cyclic prefix and a second cyclic prefix. At least one subsequence A is located between the first cyclic prefix and the second cyclic prefix, and at least one subsequence B is located between the second cyclic prefix and the guard interval.

Alternatively, at least one subsequence B is located between the first cyclic prefix and the second cyclic prefix, and at least one subsequence A is located between the second cyclic prefix and the guard interval.

Alternatively, at least one subsequence C is located between the first cyclic prefix and the second cyclic prefix, and at least one subsequence C is located between the second cyclic prefix and the guard interval.

Alternatively, at least one subsequence A and at least one subsequence B alternately occur between the first cyclic prefix and the second cyclic prefix.

A specific format for generating the random access preamble sequence is not limited to the foregoing examples, and another format that meets a requirement may be further designed based on the requirement.

In some possible implementations, the obtaining an uplink timing advance by using a difference between locations of correlation peaks of the two power delay profiles includes: obtaining possible values of normalized preamble subcarrier frequency offsets by using the difference between the locations of the correlation peaks of the two power delay profiles, and obtaining the uplink timing advance based on the possible values of the normalized preamble subcarrier frequency offsets.

For example, $$ifo_1 = \text{round}((peakidx_1 - peakidx_2) \bmod L/(d_{u1}-d_{u2}))$$

$$ifo_2 = \text{round}((peakidx_2 - peakidx_1) \bmod L/(d_{u2}-d_{u1}))$$

$$peakidx'_1 = peakidx_1 - ifo_1 \cdot d_{u1} \text{ or } peakidx_1 - ifo_2 \cdot d_{u1}$$

$$peakidx'_2 = peakidx_2 - ifo_1 \cdot d_{u2} \text{ or } peakidx_2 - ifo_2 \cdot d_{u2}$$

$ifo_1$ and $ifo_2$ represent the possible values of the normalized preamble subcarrier frequency offsets, $u_1$ is the root index of the ZC sequence used to generate the subsequence A, and $u_2$ is the root index of the ZC sequence used to generate the subsequence B.

L is a length of a power delay profile window.

$d_{u1}$ is a peak shift value that is of the ZC sequence with the root index $u_1$ and that is generated by one normalized preamble subcarrier frequency offset, and $d_{u2}$ is a peak shift value that is of the ZC sequence with the root index $u_2$ and that is generated by one normalized preamble subcarrier frequency offset.

$peakidx_1$ represents the location of the correlation peak of the power delay profile of the first detection window, and $peakidx_2$ represents the location of the correlation peak of the power delay profile of the second detection window.

A peak location corresponding to the uplink timing advance meets $peakidx = peakidx'_1 = peakidx'_2$.

In some possible implementations, the root index $u_1$ and the root index $u_2$ meet a first constraint condition and a second constraint condition.

The first constraint condition is $ifo_{max} \cdot |du_1 - du_2| < \alpha$ or $2 \cdot ifo_{max} \cdot d_u < N_{zc}/2$.

The second constraint condition is that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \bmod N_{zc}=1$, $p_{u2}$ is a minimum non-negative integer that meets $(p_{u2}u_2) \bmod N_{zc}=1$, and both $p_{u1}$ and $p_{u2}$ are greater than $N_{zc}/2$ or both $p_{u1}$ and $p_{u2}$ are less than $N_{zc}/2$, where $$d_u = \begin{cases} p & 0 \le p < N_{ZC}/2 \\ N_{ZC} - p & \text{otherwise} \end{cases}$$

$\alpha$ represents a parameter limit, p is $p_{u1}$ or $p_{u2}$, and $d_u$ is $d_{u1}$ or $d_{u2}$.

In some possible implementations, the root index $u_1$ and the root index $u_2$ meet a first constraint condition and a third constraint condition.

The first constraint condition is $ifo_{max} \cdot (d_{u1}+d_{u2}) < \alpha$ or $2 \cdot ifo_{max} \cdot d_u < N_{zc}/2$.

The third constraint condition may be that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u2}u_2) \bmod N_{zc}=1$, $p_{u2}$ is a minimum non-negative integer that meets $(p_{u2}u_2) \bmod N_{zc}=1$, $p_{u1}$ is greater than $N_{zc}/2$, and $p_{u2}$ is less than $N_{zc}/2$. $\alpha$ represents a parameter limit.

In some possible implementations, before the receiving a random access preamble sequence, the method further includes: sending a root index indication, where the root index indication is used to determine the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1=f(i)$, $u_2=g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1=f(i_1)$, $u_2=f(i_2)$, and $f(\cdot)$ represents a mapping relationship that is between a logical root index and a physical root index and that is recorded in a mapping table.

Alternatively, the root index indication includes a first logical root index $i_1$ that can be used by the root index $u_1$, $u_1=f(i_1)$, $u_2=f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{sc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

According to a fourth aspect, an embodiment of this application further provides a satellite communication device, including:
 a receiving unit, configured to receive a random access preamble sequence; and
 a detection unit, configured to detect the received random access preamble sequence by using a first detection window and a second detection window to generate two power delay profiles; and obtain an uplink timing advance by using a difference between locations of correlation peaks of the two power delay profiles.

The random access preamble sequence includes a cyclic prefix, a sequence part, and a guard interval; the sequence part includes a subsequence A and a subsequence B, or the sequence part includes a subsequence C, and the subsequence C is a time domain superimposed sequence of a subsequence A and a subsequence B; and the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer.

In some possible implementations, that the detection unit obtains an uplink timing advance by using a difference between locations of correlation peaks of the two power delay profiles includes: obtaining possible values of normalized preamble subcarrier frequency offsets by using the difference between the locations of the correlation peaks of the two power delay profiles, and obtaining the uplink timing advance based on the possible values of the normalized preamble subcarrier frequency offsets.

For example, $ifo_1 = \text{round}((\text{peakidx}_1 - \text{peakidx}_2) \bmod L/(d_{u1} - d_{u2}))$ $ifo_2 = \text{round}((\text{peakidx}_2 - \text{peakidx}_1) \bmod L/(d_{u2} - d_{u1}))$ $\text{peakidx}'_1 = \text{peakidx}_1 - ifo_1 \cdot d_{u1}$ or $\text{peakidx}_1 - ifo_2 \cdot d_{u1}$ $\text{peakidx}'_2 = \text{peakidx}_2 - ifo_1 \cdot d_{u2}$ or $\text{peakidx}_2 - ifo_2 \cdot d_{u2}$ $ifo_1$ and $ifo_2$ represent the possible values of the normalized preamble subcarrier frequency offsets, $u_1$ is the root index of the ZC sequence used to generate the subsequence A, and $u_2$ is the root index of the ZC sequence used to generate the subsequence B.

L is a length of a power delay profile window.

$d_{u1}$ is a peak shift value that is of the ZC sequence with the root index $u_1$ and that is generated by one normalized preamble subcarrier frequency offset, and $d_{u2}$ is a peak shift value that is of the ZC sequence with the root index $u_2$ and that is generated by one normalized preamble subcarrier frequency offset.

$\text{peakidx}_1$ represents the location of the correlation peak of the power delay profile of the first detection window, and $\text{peakidx}_2$ represents the location of the correlation peak of the power delay profile of the second detection window.

A peak location corresponding to the uplink timing advance meets $\text{peakidx} = \text{peakidx}'_1 = \text{peakidx}'_2$.

In some possible implementations, the root index $u_1$ and the root index $u_2$ meet a first constraint condition and a second constraint condition.

The first constraint condition is $ifo_{max} \cdot |du_1 - du_2| < \alpha$ or $2 \cdot ifo_{max} \cdot d_u < N_{zc}/2$.

The second constraint condition is that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \bmod N_{zc}=1$, $p_{u2}$ is a minimum non-negative integer that meets $(p_{u2}u_2) \bmod N_{zc}=1$, and both $p_{u1}$ and $p_{u2}$ are greater than $N_{zc}/2$ or both $p_{u1}$ and $p_{u2}$ are less than $N_{zc}/2$, where $$d_u = \begin{cases} p & 0 \le p < N_{ZC}/2 \\ N_{ZC} - p & \text{otherwise} \end{cases}$$

$\alpha$ represents a parameter limit, p is $p_{u1}$ or $p_{u2}$, and du is $d_{u1}$ or $d_{u2}$.

In some possible implementations, the root index $u_1$ and the root index $u_2$ meet a first constraint condition and a third constraint condition.

The first constraint condition is $ifo_{max} \cdot (d_{u1}+d_{u2}) < \alpha$ or $2 \cdot ifo_{max} \cdot d_u < N_{zc}/2$.

The third constraint condition may be that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \bmod N_{zc}=1$, $p_{u2}$ is a minimum non-negative integer that meets $(p_{u2}u_2) \bmod N_{zc}=1$, $p_{u1}$ is greater than $N_{zc}/2$, and $p_{u2}$ is less than $N_{zc}/2$. $\alpha$ represents a parameter limit.

In some possible implementations, the satellite communication device further includes a sending unit, configured to send a root index indication before the random access preamble sequence is received, where the root index indication is used to determine the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1=f(i)$, $u_2=g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1=f(i_1)$, $u_2=f(i_2)$, and $f(\cdot)$ represents a mapping relationship that is between a logical root index and a physical root index and that is recorded in a mapping table.

Alternatively, the root index indication includes a first logical root index $i_1$ that can be used by the root index $u_1$, $u_1=f(i_1)$, $u_2=f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{zc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

According to a fifth aspect, an embodiment of this application further provides a satellite communication device (for example, a terminal device, a ground base station, or a satellite). The satellite communication device may include a processor and a memory that are coupled to each other, where the processor is configured to invoke a computer program stored in the memory, to perform some or all of the steps of any method in the first aspect or the third aspect.

According to a sixth aspect, an embodiment of this application further provides a computer-readable storage medium, where the computer-readable storage medium stores a computer program, and the computer program is executed by a processor, to complete some or all of the steps of any method in the foregoing aspects.

According to a seventh aspect, an embodiment of this application further provides a computer program product including instructions. When the computer program product runs on user equipment, a satellite communication device is enabled to perform some or all of the steps of the methods in the foregoing aspects.

According to an eighth aspect, an embodiment of this application further provides a communication apparatus, including an input interface circuit, a logic circuit, and an output interface circuit, where the logic circuit is configured to perform some or all of the steps of any method in the foregoing aspects.

According to a ninth aspect, an embodiment of this application further provides a communication apparatus, including: at least one input end, a signal processor, and at least one output end, where the signal processor is configured to perform some or all of the steps of any method in the foregoing aspects.

BRIEF DESCRIPTION OF DRAWINGS

The following describes some accompanying drawings in embodiments of this application.

FIG. 1-A is a schematic diagram of an architecture of a communication system according to an embodiment of this application;

FIG. 1-B is a schematic diagram of a satellite communication scenario according to an embodiment of this application;

FIG. 2 is a schematic flowchart of a satellite communication method according to an embodiment of this application;

FIG. 3-A to FIG. 3-F are schematic diagrams of formats of a random access preamble sequence according to an embodiment of this application;

FIG. 4 is a schematic flowchart of another satellite communication method according to an embodiment of this application;

FIG. 5-A is a schematic diagram of detection of a random access preamble sequence according to an embodiment of this application;

FIGS. 5-B and FIG. 5-C are schematic diagrams of detection of a random access preamble sequence according to an embodiment of this application;

FIGS. 6-A to FIG. 6-D are several schematic diagrams of detection performance of a random access preamble sequence according to an embodiment of this application;

FIGS. 7-A and FIG. 7-B are a schematic diagram of a mapping table according to an embodiment of this application;

FIG. 8-A is a schematic diagram of $d_u$ distribution in which a logical root index corresponds to a physical root index according to an embodiment of this application;

FIG. 8-B is a schematic diagram of cubic metric distribution in which a logical root index corresponds to a physical root index according to an embodiment of this application;

FIG. 9 is a schematic diagram of a structure of a satellite communication device according to an embodiment of this application;

DESCRIPTION OF EMBODIMENTS

Figure 10:
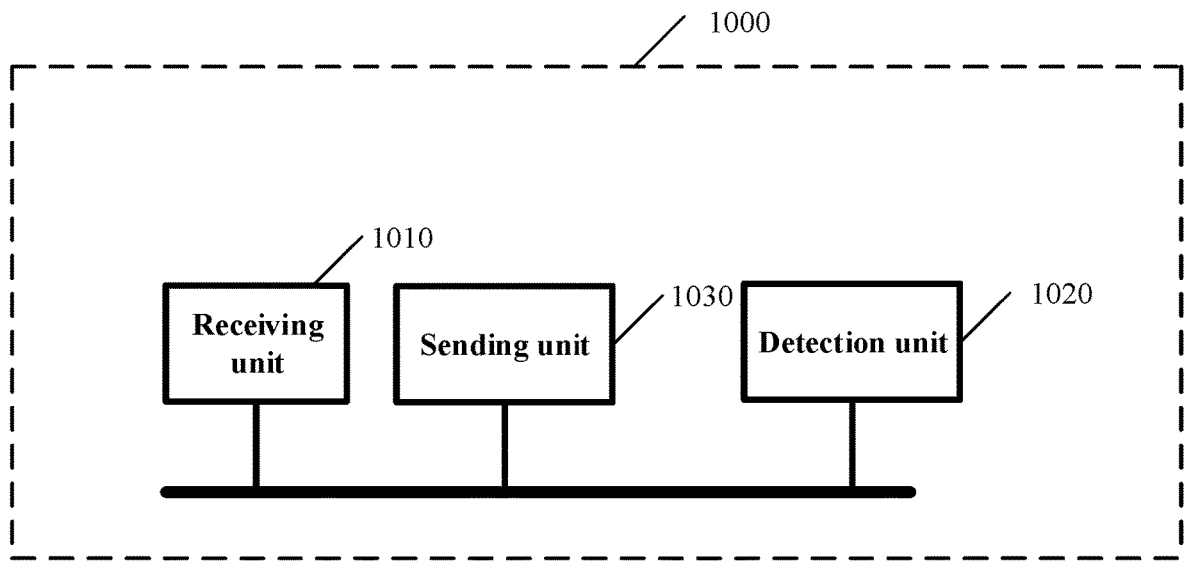
FIG. 10 is a schematic diagram of a structure of another satellite communication device according to an embodiment of this application.

The following describes embodiments of this application with reference to the accompanying drawings in embodiments of this application.

FIG. 1-A is a schematic diagram of an example of a 5G network architecture according to an embodiment of this application. In a 5G network, some function network elements (for example, a mobility management entity (MME)) in a 4G network are split, and a service-based architecture is defined. In the network architecture shown in FIG. 1-A, a function similar to that of an MME in the 4G network is split into an access and mobility management function (AMF), a session management function (SMF), and the like.

The following describes some other related network elements/entities.

A user terminal (collectively referred to as user equipment (UE)) accesses a data network (DN) or the like by accessing an operator network, and uses a service provided by an operator or a third party on the DN.

For ease of description, in embodiments of this application, the user terminal, the user equipment, a terminal device, or a terminal may be collectively referred to as UE. That is, unless otherwise specified, the UE described hereinafter in embodiments of this application may be replaced with the user terminal, the user equipment, the terminal device, or the terminal. Certainly, the user terminal, the user equipment, the terminal device, or the terminal may also be interchanged.

An access and mobility management function (AMF) is a control-plane function in a 3GPP network, and is mainly responsible for access control and mobility management when the UE accesses the operator network. A security anchor function (SEAF) may be deployed on the AMF, or deployed on a device other than the AMF. FIG. 1-A is an example in which the SEAF is deployed on the AMF. When the SEAF is deployed in the AMF, the SEAF and the AMF may be jointly referred to as an AMF.

A session management function (SMF) is a control-plane function in the 3GPP network. The SMF is mainly responsible for managing packet data unit (PDU) sessions of the UE. A PDU session is a channel used to transmit a PDU, and the UE and the DN may send a PDU to each other by using the PDU session. The SMF is responsible for management tasks such as establishment, maintenance, and deletion of the PDU session.

The data network (DN), also referred to as a packet data network (Packet Data Network, PDN), is a network located outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of the UE, and a control server of the sensor is deployed in the DN. The UE communicates with the control server. After obtaining instructions from the control server, the UE may transfer collected data to the control server according to the instructions. For another example, a DN is an internal office network of a company, a terminal used by an employee of the company may play a role of the UE, and the UE may access internal information and other resources of the company.

A unified data management network (Unified Data Management, UDM) entity is also a control-plane function in the 3GPP network. The UDM is mainly responsible for storing subscription data, credentials (credentials), permanent identifiers (SUPIs), and the like of subscribers (UEs) in the 3GPP network. The data may be used for authentication and authorization when the UE accesses a 3GPP network of an operator.

An authentication server function (AUSF) is also a control-plane function in the 3GPP network. The AUSF is mainly used for first-level authentication (in other words, subscriber authentication in the 3GPP network).

A network exposure function (NEF) is also a control-plane function in a 3GPP network. The NEF is mainly responsible for exhibiting external interfaces of the 3GPP network to third parties in a secure manner. When a function such as the SMF needs to communicate with a third-party network element, the NEF may serve as a relay for communication. The NEF can translate internal and external identifiers when serving as the relay. For example, when sending an SUPI of the UE from the 3GPP network to a third party, the NEF may translate the SUPI into a corresponding external identity (ID). Conversely, when an external identity ID is sent to the 3GPP network, the NEF may translate the external identity ID into a corresponding SUPI.

A network repository function (NRF) is also a control-plane function in the 3GPP network. The NRF is mainly responsible for storing configuration service profiles (profiles) of accessible network functions (NFs), and providing network function discovery services for other network elements.

A user plane function (UPF) is a gateway for communication between the 3GPP network and the DN.

A policy control function (PCF) is a control-plane function in the 3GPP network, and is configured to provide a policy of a PDU session for the SMF. The policy may include charging, quality of service (QoS), an authorization-related policy, and the like.

An access network (AN) is a sub-network of the 3GPP network. To access the 3GPP network, the UE needs to first access the AN. In a radio access scenario, the AN is also referred to as a radio access network (RAN). Therefore, terms "RAN" and "AN" are usually used interchangeably.

The 3GPP network is a network that complies with 3GPP specifications. In FIG. 1-A, parts other than the UE and the DN may be considered as the 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, and N6 in the architecture shown in FIG. 1-A represent reference points (Reference Points) between related entities/network functions. Nausf, Namf, and the like represent service-oriented interfaces of related network functions.

Certainly, the 3GPP network and a non-3GPP network may coexist, and some network elements in the 5G network may also be used in some non-5G networks.

In the future, the ground 5G will have a complete industry chain, a large user group, a flexible and efficient application service mode, and the like. Therefore, an important direction for communication development in the future is as follows: A satellite communication system and the 5G network are mutually integrated and learn from each other, to jointly form a global integrated communication network seamlessly covering sea, land, air, and space, to meet a plurality of ubiquitous service requirements of users.

FIG. 1-B is a schematic diagram of an example of a satellite communication scenario. For a communication scenario in which a satellite has a signal processing capability or a satellite transparently forwards a user signal to a ground base station to implement wide-area coverage, a protocol stack compatible with a 3GPP LTE/NR protocol may be used. The user terminal is a common mobile terminal or a dedicated terminal, and a transmission process also follows the LTE/NR protocol. Solutions discussed in this application are also applicable to a ground mobile communication scenario defined in 3GPP LTE/NR, and are more applicable to a high-speed mobile communication scenario, for example, a high-speed train or an airplane.

The following briefly describes the satellite communication scenario.

For an asynchronous satellite mobile communication system, especially a low earth orbit satellite mobile communication system, a running speed of the satellite is relatively fast, which makes a signal produce a large-scale fast time-varying Doppler frequency offset in a transmission process. It is found that, in the satellite mobile communication system, main factors that cause a time-frequency synchronization problem are a large Doppler frequency offset and a frequency offset caused by a crystal oscillator error. However, a conventional time-frequency estimation algorithm can estimate a superimposed value of only two frequency offsets in downlink synchronization, namely, $f_d+f_e$, where $f_d$ represents a Doppler frequency offset, and $f_e$ represents a frequency offset caused by a crystal oscillator error. Because a generation principle of the Doppler frequency offset is different from a generation principle of the frequency offset caused by the crystal oscillator error, an appropriate frequency offset compensation manner should be that the terminal side compensates $-f_d+f_e$ for a sent uplink signal, that is, a negative compensation manner is used for the Doppler frequency offset, and a positive compensation manner is used for the frequency offset caused by the crystal oscillator error. If the user terminal directly uses a frequency offset estimation result of downlink synchronization to perform frequency offset compensation on an uplink transmission signal, a frequency offset $2f_e$ (negative compensation) or $2f_d$ (positive compensation) is introduced into the uplink signal.

For example, in a satellite communication scenario, a satellite orbital height of a low earth orbit satellite communication system is 600 km. A satellite base station uses a Doppler frequency offset at a beam center as a pre-compensation value, to compensate for some of Doppler frequency offsets in downlink data. Based on parameters provided in a 3GPP conference document, in this system, a residual Doppler frequency offset of a terminal at an edge of an under-satellite beam whose radius is 200 km is 4.14 ppm, a crystal oscillator error of the terminal is 5 ppm, and a crystal oscillator error of the satellite base station is ignored. After the user terminal obtains a frequency offset estimation value, if the positive compensation manner is used, a maximum uplink residual frequency offset is about 8.3 ppm, to be specific, a residual frequency offset is 16.6 kHz when a carrier is 2 GHz, and the residual frequency offset is 249 kHz when the carrier is 30 GHz; or if the negative compensation manner is used, a maximum uplink residual frequency offset is about 10 ppm, to be specific, a residual frequency offset is 20 kHz when a carrier is 2 GHz, and the residual frequency offset is 300 kHz when the carrier is 30 GHz. It can be learned that the uplink residual frequency offset of the satellite mobile communication system is much greater than an uplink residual frequency offset of a ground communication system. However, a large residual frequency offset has a serious impact on a random access preamble sequence specified in the LTE/NR protocol, resulting in degradation of uplink synchronization performance of the random access preamble sequence, and even a complete failure of an uplink synchronization function of the random access preamble sequence.

A random access preamble sequence that is designed in the present invention and that is applicable to a scenario in which an uplink signal includes a large frequency offset has a good anti-frequency offset capability. Therefore, the random access preamble sequence is also referred to as an anti-frequency offset random access preamble sequence. The random access preamble sequence includes three parts: a cyclic prefix, a sequence part, and a guard interval. The sequence part includes at least one subsequence A and at least one subsequence B. The subsequence A and the subsequence B are generated from different ZC sequences. Each subsequence A includes at least one preamble symbol, and each subsequence B includes at least one preamble symbol. The cyclic prefix may be generated by using data of an end segment of the sequence part.

In a random access process, a terminal side sends the random access preamble sequence in the foregoing format. Even if a sequence part received by a base station side includes a large frequency offset, the base station side can obtain a correct uplink timing location by using a corresponding detection algorithm.

FIG. 2 is a schematic flowchart of an example of a satellite communication method according to an embodiment of this application. The satellite communication method may include the following steps.

201: Generate a random access preamble sequence, where the random access preamble sequence includes a cyclic prefix, a sequence part, and a guard interval.

The sequence part includes a subsequence A and a subsequence B. Alternatively, the sequence part includes a subsequence C, and the subsequence C is a time domain superimposed sequence of a subsequence A and a subsequence B.

The subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer.

202: Output the random access preamble sequence.

It can be learned that in the solution of this embodiment of this application, a random access preamble sequence that includes a plurality of preamble symbols and that has an anti-frequency offset capability is designed, and the random access preamble sequence includes preamble symbols generated by using different ZC sequences. It is found in a test that the random access preamble sequence has a good anti-frequency offset capability.

The following describes in detail a basic format of the random access preamble sequence.

FIG. 3-A shows an example of a format of a random access preamble sequence. The random access preamble sequence of the format shown in the example of FIG. 3-A includes three parts: a cyclic prefix, a sequence part, and a guard interval. The sequence part includes a subsequence A and a subsequence B, the subsequence A and the subsequence B are respectively generated by using ZC sequences of different root indexes, and each subsequence includes at least one preamble symbol. The cyclic prefix may be an end segment of the subsequence B.

A length relationship among the cyclic prefix, the subsequence A, and the subsequence B may meet the following condition: Both a length of the subsequence A and a length of the subsequence B are greater than or equal to a length of the cyclic prefix, and the cyclic prefix may include preamble symbols of an integral quantity or a non-integral quantity.

Generally, the length of the subsequence A may be equal to the length of the subsequence B, that is, a quantity of preamble symbols included in the subsequence A is equal to that of preamble symbols included in the subsequence B.

FIG. 3-B shows an example of an extended format of a random access preamble sequence.

Further, based on the random access preamble sequence of the basic format shown in FIG. 3-A, the random access preamble sequence shown in FIG. 3-B is extended and designed. The random access preamble sequence also includes three parts: a cyclic prefix, a sequence part, and a guard interval. The sequence part includes two parts: a subsequence A and a subsequence B that occur alternately, where the subsequence A occurs m times in total, and the subsequence B occurs m or m−1 times in total. The subsequence A is generated by using a ZC sequence of a root index, and the subsequence B is generated by using a ZC sequence of another root index. The subsequence A and the subsequence B each include at least one preamble symbol. The cyclic prefix is generated by using an end segment of data (the subsequence A or the subsequence B) before the guard interval.

A length relationship among the cyclic prefix, the subsequence A, and the subsequence B may meet the following condition: Both a length of the subsequence A and a length of the subsequence B are greater than or equal to a length of the cyclic prefix, and the cyclic prefix may include preamble symbols of an integral quantity or a non-integral quantity. Generally, in the sequence part, a total quantity of subsequences A may be equal to a total quantity of subsequences B, and a length of all of the subsequences A is equal to that of all of the subsequences B, that is, a quantity of preamble symbols included in all of the subsequences A is equal to that of preamble symbols included in all of the subsequences B.

FIG. 3-C shows an example of another extended format of a random access preamble sequence.

Further, based on the random access preamble sequence of the basic format shown in FIG. 3-A, the random access preamble sequence of the format shown in FIG. 3-C is extended and designed. This anti-frequency offset sequence part includes three parts: a cyclic prefix, a sequence part, and a guard interval. The sequence part includes two parts: a subsequence A and a subsequence B that occur alternately, where there is a cyclic prefix before a start location of the subsequence A and a start location of the subsequence B, and the cyclic prefix is generated from data of an end segment of an immediately following sequence part. The subsequence A is generated by using a ZC sequence of a root index, and the subsequence B is generated by using a ZC sequence of another root index. The subsequence A and the subsequence B each include at least one preamble symbol.

For example, a length relationship between the cyclic prefix and the sequence part may meet the following condition: A length of the subsequence A is greater than or equal to a length of a cyclic prefix adjacent to the subsequence A, a length of the subsequence B is greater than or equal to a length of a cyclic prefix adjacent to the subsequence B, there is no necessary relationship between a length of the subsequence A plus the adjacent cyclic prefix and a length of the subsequence B plus the adjacent cyclic prefix of the subsequence B, and each cyclic prefix may include preamble symbols of an integral quantity or a non-integral quantity. Generally, the length of the subsequence A plus the adjacent cyclic prefix is equal to the length of the subsequence B plus the adjacent cyclic prefix, and the length of the part A is equal to the length of the part B, that is, a quantity of preamble symbols included in the part A is equal to that of preamble symbols included in the part B.

FIG. 3-D shows an example of another extended format of an anti-frequency offset random access preamble sequence.

Further, based on the random access preamble sequence of the format shown in FIG. 3-C, the anti-frequency offset random access preamble sequence of the format shown in FIG. 3-D is extended and designed. This anti-frequency offset random access preamble sequence includes three parts: a cyclic prefix, a sequence part, and a guard interval. The sequence part includes two parts: a subsequence A and a subsequence B that occur alternately, where there is a cyclic prefix before a start location of the subsequence A and a start location of the subsequence B, and the cyclic prefix is generated from data of an end segment of an adjacent sequence part. The subsequence A occurs m times in total, and the subsequence B occurs m or m−1 times in total. The subsequence A is generated by using a ZC sequence of a root index, and the subsequence B is generated by using a ZC sequence of another root index. The subsequence A and the subsequence B each include at least one preamble symbol.

For example, a length relationship between the cyclic prefix and the sequence part meets the following condition: A length of the subsequence A is greater than or equal to a length of a cyclic prefix adjacent to the subsequence A, a length of the subsequence B is greater than or equal to a length of a cyclic prefix adjacent to the subsequence B, there is no necessary relationship between a length of the subsequence A plus the adjacent cyclic prefix and a length of the subsequence B plus the adjacent cyclic prefix of the subsequence B, and each cyclic prefix may include preamble symbols of an integral quantity or a non-integral quantity. Generally, a total quantity of subsequences A is equal to a total quantity of subsequences B, lengths of cyclic prefixes adjacent to all of the subsequences A are equal to those of cyclic prefixes adjacent to the subsequences B, and a length of all of the subsequences A is equal to that of all of the subsequences B, that is, a quantity of preamble symbols included in all of the subsequences A is equal to that of preamble symbols included in the subsequences B.

In the random access preamble sequences of the formats in the foregoing examples, the sequence part includes at least two preamble symbols, and the preamble symbols are generated by using two different ZC sequences. The designed formats that are shown in FIG. 3-A and FIG. 3-B and in which there is no cyclic prefix between symbols and the sequence part includes a plurality of preamble symbols are compatible with most random access preamble sequence formats specified in an existing protocol, but different ZC sequences need to be filled in the preamble symbols. In addition, these formats are easy to be further extended. In the designed formats that are shown in FIG. 3-C and FIG. 3-D and in which there is a cyclic prefix between symbols and the sequence part includes a plurality of preamble symbols, the cyclic prefix makes detection performance more robust. In addition, because a communication distance of a satellite communication system is long, a longer sequence part needs to be used in consideration of a link budget. Therefore, a design idea of the sequence part including a plurality of preamble symbols is consistent with a requirement of the link budget.

In addition, based on the random access preamble sequence basic format shown in FIG. 3-A, an anti-frequency offset preamble sequence format shown in FIG. 3-E may be further extended and designed.

The random access preamble sequence shown in FIG. 3-E includes three parts: a cyclic prefix, a sequence part, and a guard interval. The sequence part uses a preamble symbol generated by superimposing two ZC sequences of different root indexes. It may be considered that a subsequence A is generated by one ZC sequence, a subsequence B is generated by the other ZC sequence, a subsequence C obtained by superimposing a time domain of the subsequence A and a time domain of the subsequence B is used as the sequence part of the random access preamble sequence, and the sequence part includes at least one preamble symbol. The cyclic prefix is an end segment of the sequence part, a length of the cyclic prefix is less than or equal to a length of the preamble sequence part, and the cyclic prefix may include preamble symbols of an integral quantity or a non-integral quantity.

Further, the format shown in FIG. 3-E may also be extended and applied to the anti-frequency offset random access preamble sequence formats shown in FIG. 3-A to FIG. 3-D, and all preamble symbols of a sequence part of each format may be generated in a manner of superimposing ZC sequences of two different root indexes.

Further, to resist an impact of a large round-trip transmission delay in a satellite communication system, two different preamble symbols may be used in each region (a region A, a region B, or a region A+B) of the sequence parts of the anti-frequency offset random access preamble sequence formats shown in FIG. 3-A to FIG. 3-E, so that a base station can perform uplink timing point estimation by using the preamble sequence in the format. Two types of preamble symbols in a region are respectively recorded as a preamble symbol α and a preamble symbol β. It is assumed that the preamble symbol α is a conventional symbol used in the region, the preamble symbol β is a preamble symbol added in the region to resist a large delay, and each region needs to include at least one symbol α and at least one symbol β. The symbol β is a symbol different from the symbol α. For example, the symbol β may be generated by using a ZC sequence whose root index is different from a root index of a ZC sequence used to generate the symbol α, may be generated by using another pseudo-random sequence, or the symbol β may be directly set to be zero.

For ease of understanding, a specific anti-frequency offset random access preamble sequence is used as an example herein. A format shown in FIG. 3-F can simultaneously resist an impact of a large round-trip transmission delay and an uplink residual frequency offset in a satellite communication scenario.

It is assumed that a sequence part is generated based on a ZC sequence whose length is 839, a subcarrier width of the preamble sequence is 1.25 kHz, and a length of a preamble symbol is 0.8 ms. The random access preamble sequence format shown in FIG. 3-F is actually a specific form of the second extended format (FIG. 3-C) of the anti-frequency offset preamble sequence, where the format includes two cyclic prefixes, and a length of each cyclic prefix is 2.284 ms and is equivalent to 2.855 preamble symbols, that is, the length of each cyclic prefix of the format is a 0.684 ms cyclic prefix of a preamble format 1 specified in an NR protocol plus two preamble symbols; and each cyclic prefix is followed by a sequence, each sequence part includes three preamble symbols, the second and third symbols of each sequence part are filled with ZC sequences, and the first preamble symbol is filled with another preamble symbol. Herein, the second and third symbols of a first sequence are generated by using a ZC sequence whose root index is $u_1$, and the second and third symbols of a second sequence are generated by using a ZC sequence whose root index is $u_2$. To improve related performance and reduce use of root indexes, the first symbol of the first sequence in the format is generated by using the ZC sequence whose root index is $u_2$, and the first symbol of the second sequence is generated by using the ZC sequence whose root index is $u_1$. The first symbol of each sequence is a new symbol that adapts to a large delay scenario and that may be used to assist in determining an integral symbol boundary of uplink timing.

Because the random access preamble sequence in the foregoing example has a specific anti-frequency offset function, the random access preamble sequence may also be referred to as an anti-frequency offset random access preamble sequence. That is, the anti-frequency offset random access preamble sequence and the random access preamble sequence may be mixed.

The following further describes a related detection solution of an anti-frequency offset random access preamble sequence by using an example.

FIG. 4 is a schematic flowchart of an example of a satellite communication method according to an embodiment of this application. The satellite communication method may include the following steps.

401: Receive a random access preamble sequence.

A specific format of the random access preamble sequence may be any format in the examples in the foregoing embodiment, and details are not described herein again.

402: Detect the received random access preamble sequence by using a first detection window and a second detection window to generate two power delay profiles.

403: Obtain an uplink timing advance by using a difference between locations of correlation peaks of the two power delay profiles.

The obtaining an uplink timing advance by using a difference between locations of correlation peaks of the two power delay profiles includes: obtaining possible values of normalized preamble subcarrier frequency offsets by using the difference between the locations of the correlation peaks of the two power delay profiles, and obtaining the uplink timing advance based on the possible values of the normalized preamble subcarrier frequency offsets.

The following uses the anti-frequency offset sequence part in the format shown in FIG. 3-A as an example for specific description.

For example, a terminal side selects a ZC sequence whose root index is $u_1$ to generate a subsequence A of the sequence part, and selects a ZC sequence whose root index is $u_2$ to generate a subsequence B of the sequence part. Both cyclic shifts $C_v$ of the ZC sequences of the two subsequences are set to be 0. A process of generating the random access preamble sequence may be the same as a manner specified in an NR protocol.

A base station side detects the sequence part by using two detection windows shown in FIG. 5-A. The first detection window (a detection window ①) corresponds to the subsequence A, and the second detection window (a detection window ②) corresponds to the subsequence B.

Specifically, data in the two detection windows may be detected by using local sequence sets of the two subsequences and a classical random access receiving algorithm, and two independent power delay profiles (PDP) are generated.

Refer to FIG. 5-B. When frequency offsets included in the random access preamble sequence received by the base station side are exactly equal to normalized preamble subcarriers of an integral quantity, outputs of the two power delay profiles are shown, for example, in an example of FIG. 5-B. In FIG. 5-B, ifo represents that the sequence part received by the base station includes ifo normalized preamble subcarrier frequency offsets, $d_{u1}$ is a peak shift value that is of the ZC sequence with the root index $u_1$ and that is generated by one normalized preamble subcarrier frequency offset, and $d_{u2}$ is a peak shift value that is of the ZC sequence with the root index $u_2$ and that is generated by one normalized preamble subcarrier frequency offset. The power delay profiles generated by the detection window ① and the detection window ② are mutually independent. For ease of description herein, the two power delay profiles are combined and displayed in a diagram.

The data in the detection windows ① and ② is generated from ZC sequences of different root indexes, and peak offsets ifo·$d_u$ of ZC sequences of different root indexes are different due to the ifo normalized preamble subcarrier frequency offsets. Therefore, values ifo of the normalized preamble subcarrier frequency offsets can be calculated by using a difference between locations of correlation peaks of the two power delay profiles, and an actual peak location can be further calculated based on the difference.

An example of a calculation method is as follows:

$$ifo_1 = \text{round}((\text{peakidx}_1 - \text{peakidx}_2) \bmod L/(d_{u1} - d_{u2}))$$

$$ifo_2 = \text{round}((\text{peakidx}_2 - \text{peakidx}_1) \bmod L/(d_{u2} - d_{u1}))$$

$$\text{peakidx}'_1 = \text{peakidx}_1 - ifo_1 \cdot d_{u1} \text{ or } \text{peakidx}_1 - ifo_2 \cdot d_{u1}$$

$$\text{peakidx}'_2 = \text{peakidx}_2 - ifo_1 \cdot d_{u2} \text{ or } \text{peakidx}_2 - ifo_2 \cdot d_{u2}$$

In the formula, L represents a length of a power delay profile window, $\text{peakidx}_1$ represents the location of the correlation peak of the power delay profile of the detection window ①, and $\text{peakidx}_2$ is the location of the correlation peak of the power delay profile of the detection window ②.

The possible values $ifo_1$ and $ifo_2$ of the normalized preamble subcarrier frequency offsets are obtained by using the locations of the correlation peaks, and the possible values are substituted into a peak calculation formula. When $\text{peakidx}'_1 = \text{peakidx}'_2$, an actual timing location $\text{peakidx} = \text{peakidx}'_1 = \text{peakidx}'_2$ is obtained.

Refer to FIG. 5-C. When the random access preamble sequence received by the base station side includes normalized preamble subcarrier offsets of a non-integral quantity, outputs of the two power delay profiles are shown in an example of FIG. 5-C. A detection method of the scenario is similar to the foregoing method. After detecting energy and locations of respective maximum peaks, the detection windows ① and ② find locations of large adjacent peaks with a distance of $d_u$ from the locations of the maximum peaks based on $d_u$ offsets of respective ZC sequences, and record the energy and the locations of the maximum peaks and energy and the locations of the large adjacent peaks. The actual peak location may also be calculated in the foregoing manner based on relationships between the locations of the maximum peaks and the locations of the large adjacent peaks of the detection windows ① and ②.

For example, it is assumed that a maximum possible normalized preamble subcarrier frequency offset is $ifo_{max} = \lceil f_{d\ max}/\Delta f_{RA} \rceil$, where $f_{d\ max}$ is a maximum residual frequency offset, and $\Delta f_{RA}$ is a preamble subcarrier spacing. When the foregoing method is used to detect a timing location, the root indexes $u_1$ and $u_2$ of the ZC sequences that are selected by the terminal and that are included in the anti-frequency offset sequence part meet, for example, at least the following two conditions.

A first constraint condition is $ifo_{max} \cdot |du_1 - du_2| < \alpha$.

A second constraint condition is that the root indexes $u_1$ and $u_2$ meet $(p_{u1} u_1) \bmod N_{zc} = 1$ and $(p_{u2} u_2) \bmod N_{zc} = 1$, $p_{u1}$ is a minimum non-negative integer that meets $(p_{u1} u_1) \bmod N_{zc} = 1$, $p_{u2}$ is a minimum non-negative integer that meets $(p_{u2} u_2) \bmod N_{zc} = 1$, and both $p_{u1}$ and $p_{u2}$ are greater than $N_{zc}/2$ or both $p_{u1}$ and $p_{u2}$ are less than $N_{zc}/2$, where $$d_u = \begin{cases} p & 0 \le p < N_{ZC}/2 \\ N_{ZC} - p & \text{otherwise} \end{cases}$$

$\alpha$ represents a parameter limit, p is $p_{u1}$ or $p_{u2}$, and $d_u$ is $d_{u1}$ or $d_{u2}$.

For example, the parameter limit $\alpha$ described in the first constraint condition (a condition ①) is a value comprehensively considered based on a theory and actual detection. $\alpha$ is a positive integer, and a value of $\alpha$ may be set to be $N_{zc}$ or $N_{zc}/2$. When $|d_{u1} - d_{u2}|$ corresponding to the root indexes $u_1$ and $u_2$ of the ZC sequences included in the anti-frequency offset preamble sequence is not too small, the value is set to be $N_{zc}$ to expand a frequency offset range that can be resisted by the anti-frequency preamble sequence; and when $|d_{u1} - d_{u2}|$ is small or a system frequency offset range is not too large, the value is set to be $N_{ZC}/2$ to improve detection performance to some extent. It should be noted that when only a theoretical limit is considered, a maximum normalized preamble subcarrier frequency offset range that can be resisted by the anti-frequency offset sequence part including different ZC sequences is $|ifo_{max}| < N_{zc}/2$. However, to reach the theoretical limit, it is required that there should be no deviation between a peak location obtained during detection and a theoretical location. However, in an actual processing process of the base station, there are often several sampling point deviations between the detected peak location and the theoretical location due to factors such as noise interference and an error in accuracy of determining sampling points. Considering that a detection solution applied to an actual system should be practical, a resistible frequency offset range is reduced to some extent herein.

A requirement of the second constraint condition (a condition ②) is essentially that when there is one normalized preamble subcarrier frequency offset, peak locations of the power delay profiles of the two ZC sequences are limited, so that the peak locations simultaneously occur on a left side or a right side of a real timing location. In the condition ②, after directions of offsets that are of peaks of the power delay profiles and that are caused by a frequency offset are specified, a difference between the two peaks may be used to calculate the frequency offset and the real timing location.

Further, in actual detection, to avoid a performance loss caused by detection errors of several sampling points of the peak location, $d_{u1}$ and $d_{u2}$ corresponding to the two root indexes $u_1$ and $u_2$ may meet, for example, the following condition:

$$|d_{u1} - d_{u2}| > \beta$$

$\beta$ is a relatively small positive integer, for example, $\beta = \{1, 2, 3, 4, 5\}$. Certainly, $\beta$ may be alternatively a positive integer of another value.

According to another aspect, when the random access preamble includes one normalized preamble subcarrier frequency offset, if the peak locations of the power delay profiles of the two ZC sequences included in the sequence part respectively occur on the left side and the right side of the real timing position, frequency offset and real timing location calculation may also be performed based on the foregoing detection idea.

For example, it is assumed that a maximum possible normalized preamble subcarrier frequency offset is $ifo_{max} = \lceil f_{d\ max}/\Delta f_{RA} \rceil$, where $f_{d\ max}$ is a maximum residual frequency offset, and $\Delta f_{RA}$ is a preamble subcarrier spacing. In this case, the root indexes $u_1$ and $u_2$ of the ZC sequences that are selected by a user terminal and that are included in the anti-frequency offset sequence part meet, for example, at least the following two conditions.

A third constraint condition is $ifo_{max} \cdot (d_{u1}+d_{u2}) < \alpha$.

A fourth constraint condition is that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \bmod N_{zc}=1$, $p_{u2}$ is a minimum non-negative integer that meets $(p_{u2}u_2) \bmod N_{zc}=1$, $p_{u1}$ is greater than $N_{zc}/2$, and $p_{u2}$ are less than $N_{zc}/2$.

$\alpha$ represents a parameter limit.

In particular, if the root indexes $u_1$ and $u_2$ of the two ZC sequences included in the anti-frequency offset sequence part meet $u_1+u_2=N_{xc}$, the two ZC sequences are sequences conjugate to each other, $d_u$ of the conjugate sequences are the same, and the conjugate sequences meet, for example, the fourth constraint condition (namely, a condition ④). In this case, the third constraint condition (a condition ③) may be changed to: $2 \cdot ifo_{max} \cdot d_u < \alpha$.

Random access preamble sequence formats 1, 2, 3, B1, and B4 specified in the NR protocol are used as examples. When two ZC sequences that meet the first constraint condition and the second constraint condition (the third constraint condition and the fourth constraint condition) are filled in each random access preamble sequence, corresponding detection performance may be specifically shown in FIG. 6-A to FIG. 6-D.

A simulation channel is a white Gaussian noise (Additive White Gaussian Noise, AWGN) channel, the sequence part includes 2.5 normalized preamble subcarrier frequency offsets, and a timing detection threshold is determined based on a requirement of a false-alarm probability 0.1%.

FIG. 6-A shows an example of detection performance of random access preamble sequences that meet the first constraint condition and the second constraint condition (the random access preamble sequence formats 1, 2, and 3).

FIG. 6-B shows an example of detection performance of random access preamble sequences that meet the first constraint condition and the second constraint condition (the random access preamble sequence formats B1 and B4).

FIG. 6-C shows an example of detection performance of random access preamble sequences that meet the third constraint condition and the fourth constraint condition (the random access preamble sequence formats 1, 2, and 3).

FIG. 6-D shows an example of detection performance of random access preamble sequences that meet the third constraint condition and the fourth constraint condition (the random access preamble sequence formats B1 and B4).

It can be learned from a simulation result that all anti-frequency offset random access preamble sequences that each include two ZC sequences that meet the first constraint condition and the second constraint condition (or the third constraint condition and the fourth constraint condition) have good uplink synchronization performance, and there is almost no difference in detection performance. However, it can be learned from the constraint conditions that a ZC sequence selected under the first constraint condition and the second constraint condition can resist a larger frequency offset range.

In this application, a detection mechanism of the anti-frequency offset sequence part is given in the foregoing examples, and the constraint conditions for use of the root indexes of the ZC sequences for generating the anti-frequency offset sequence part are also given in the examples. When detecting the uplink timing location by using the solution in this embodiment, the base station may need to perform only two channels of frequency domain detection at once, and processing complexity is relatively low.

According to a detection result of a designed anti-frequency offset random access preamble, because this type of anti-frequency offset random access preamble that includes a plurality of preamble symbols includes preamble symbols generated by using different ZC sequences, the sequence has a better anti-frequency offset capability. In addition, the sequence format is designed to meet a link budget requirement, and is compatible with a sequence part generation manner and most sequence part structures specified in the NR protocol. In addition, preamble symbols generated by using different ZC sequences may be further used for detection of a timing location greater than one preamble symbol length, and are applicable to a satellite cell of a larger range. These advantages meet main design requirements of the satellite communication system for the random access preamble sequence, where the main design requirements include a large coverage area, a good anti-frequency offset capability, and a link budget requirement.

The following provides, by using an example, a root index transmission manner of the ZC sequences of the anti-frequency offset sequence part, and further provides some applicable root index mapping tables by using an example.

According to the NR protocol, the terminal obtains a first available logical root index from a prach-RootSequenceIndex field of a SIB 1 message. If there are less than 64 sequence parts (there are totally 64 available sequence parts in each cell) generated by a root sequence corresponding to the logical root index through cyclic shift, a root index corresponding to a next logical root index is used by default to continue to generate sequence parts, until all the 64 sequence parts are generated. When the sequence parts are generated, the sequence parts are numbered 0 to 63 first based on an order of cyclic shift increment and then based on an order of logical root index increment, so that the terminal side can select one sequence from all generated sequences for use in a random access process. In addition, a relationship between a logical root index and a physical root index actually used to generate a ZC sequence is determined based on a logical root index-physical root index mapping table specified in a protocol. Physical root indexes whose values are u and $N_{zc}-u$ in the mapping table are placed at adjacent locations, that is, root indexes for generating ZC sequences conjugate to each other are placed at adjacent locations.

In the examples of this application, the anti-frequency offset random access preamble sequence is generated by using two ZC sequences.

When the two ZC sequences are not conjugate to each other, the user terminal needs to obtain indication information of two root indexes. The following describes indication manners of the root indexes by using specific examples.

A first indication manner of the root indexes may be as follows: The root indexes $u_1$ and $u_2$ each have a different logical root index-physical root index mapping table, and the prach-RootSequenceIndex field of the SIB 1 message uses a unified value to indicate first logical root indexes that may be used by $u_1$ and $u_2$. For example, the first logical root indexes indicated by the prach-RootSequenceIndex field are i, and the user terminal respectively obtains $u_1=f(i)$ and $u_2=g(i)$ based on the mapping tables of $u_1$ and $u_2$. The two logical root index-physical root index mapping tables may be two re-designed tables, or one of the two logical root index-physical root index mapping tables is a mapping table specified in an LTE/NR protocol, and the other is a re-designed mapping table. Considering that the mapping table follows a design idea that is in an existing protocol and in which root indexes of ZC sequences conjugate to each other are placed at adjacent locations, when the terminal cannot generate enough sequence parts by using an $n^{th}$ logical root index, a root index corresponding to an $(n+2)^{th}$ logical root index should be used by default to continuously generate sequence parts.

A second indication manner of the root indexes may be as follows: The root indexes $u_1$ and $u_2$ use a same logical root index-physical root index mapping table, where one logical root index indication is added to the prach-RootSequenceIndex field of the SIB 1 message on an original basis, to respectively indicate, by using two values, first logical root indexes used by $u_1$ and $u_2$. For example, the first logical root indexes indicated by the prach-RootSequenceIndex field are $i_1$ and $i_2$, and correspondingly, the user terminal may obtain $u_1=f(i_1)$ and $u_2=f(i_2)$ based on the mapping table shared by $u_1$ and $u_2$. The used logical root index-physical root index mapping table may be a re-designed mapping table, or a mapping table specified in an LTE/NR protocol. Considering that the mapping table follows a design idea that is in the LTE/NR protocol and in which root indexes of ZC sequences conjugate to each other are placed at adjacent locations, when the terminal cannot generate enough root indexes by using an $n^{th}$ logical root index, a root index corresponding to an $(n+2)^{th}$ logical root index may be used by default to continuously generate sequence parts.

A third indication manner of the root indexes may be as follows: The root indexes $u_1$ and $u_2$ use a same logical root index-physical root index mapping table, the prach-RootSequenceIndex field of the SIB 1 message uses a unified value to indicate a first logical root index that may be used by $u_1$ or $u_2$, and there is a relationship between first logical root indexes used by $u_1$ and $u_2$. For example, the first logical root index indicated by the prach-RootSequenceIndex field for $u_1$ is $i_1$, and $u_1=f(i_1)$ and $u_2=f(g(i_1))$ are obtained based on a mapping table relationship and a logical root index relationship between $u_1$ and $u_2$, where $g(\cdot)$ represents a functional relationship between the first logical root indexes $i_1$ and $i_2$ used by $u_1$ and $u_2$, for example, $i_2=i_1+2$. Certainly, the functional relationship may be alternatively another functional relationship. The used logical root index-physical root index mapping table may be a re-designed mapping table, or a mapping table specified in an LTE/NRNR protocol. Considering that the mapping table follows a design idea that is in the LTE/NR protocol and in which root indexes of ZC sequences conjugate to each other are placed at adjacent locations, when the terminal cannot generate enough root indexes by using an $n^{th}$ logical root index, a root index corresponding to an $(n+2)^{th}$ logical root index may be used by default to continuously generate sequence parts.

When the two ZC sequences are sequences conjugate to each other, because root indexes that can generate conjugate ZC sequences are placed at adjacent locations in the mapping table specified in the protocol, the terminal may need to obtain indication information of only one root index.

The prach-RootSequenceIndex field of the SIB 1 message use a unified value to indicate first logical root indexes that may be used by u and $N_{sc}-u$. For example, the first logical root indexes indicated by the prach-RootSequenceIndex field are i, the terminal obtains $u=f(i)$ and $(N_{sc}-u)=f(i+1)$ based on the mapping table relationship. The used logical root index-physical root index mapping table may be a re-designed mapping table, or a mapping table specified in an existing LTE/NR protocol. Considering that the mapping table follows a design idea that is in the LTE/NR protocol and in which root indexes of ZC sequences conjugate to each other are placed at adjacent locations, when the terminal cannot generate enough root indexes by using an $n^{th}$ logical root index, a root index corresponding to an $(n+2)^{th}$ logical root index may be used by default to continuously generate sequence parts.

Because the first constraint condition and the second constraint condition may enable the sequence part to resist a larger frequency offset range, when the logical root index-physical root index mapping table specified in the LTE/NR protocol is used, it is difficult to ensure that all anti-frequency offset sequence parts generated by successively selected root indexes meet the first constraint condition and the second constraint condition. Therefore, based on a basic design idea of the mapping table specified in the LTE/NR protocol, a mapping table is re-designed so that the first constraint condition and the second constraint condition can be met when root indexes are successively selected.

The logical root index-physical root index mapping table used in the LTE/NR protocol is determined based on two factors: Each root index corresponds to a cubic metric (Cubic Metric, CM) of a ZC sequence and a maximum cyclic shift that may be supported by a high-speed cell. The cubic metric directly affects cell coverage. The maximum cyclic shift that may be supported by a high-speed cell is determined in the protocol, preamble detection of the high-speed cell is supported by a corresponding algorithm, and both a cyclic shift and an available root index of the high-speed cell are related to the corresponding algorithm. The anti-frequency offset random access preamble sequence proposed in the examples in this application has a specific anti-frequency offset capability, and does not need to reuse a high-speed scenario algorithm specified in the LTE/NR protocol. Therefore, when the logical root index-physical root index mapping table is re-designed, a mainly considered factor is that each root index corresponds to a cubic metric of a ZC sequence.

A logical root index-physical root index mapping table of a long sequence $N_{zc}=839$ is used as an example. 838 root indexes in the designed mapping table are divided into two groups: a low cubic metric group and a high cubic metric group. The low cubic metric group includes 456 root indexes and the high cubic metric group includes 382 root indexes. The root indexes of the low cubic metric group and the root indexes of the high cubic metric group are separately divided into 16 subgroups, and the subgroups are numbered 1 to 16. The first root index of an $i^{th}$ subgroup number has a similar cubic metric to the last root index of an $(i-1)^{th}$ subgroup number, and the last root index of the $i^{th}$ subgroup number has a similar cubic metric to the first root index of an $(i+1)^{th}$ subgroup number. In addition, it is ensured that cubic metrics of adjacent root indexes in the $i^{th}$ subgroup do not change suddenly, so that root indexes that can generate conjugate ZC sequences have a same cubic metric, and are placed at adjacent locations in the mapping table. This design ensures that successively selected root indexes have similar cubic metrics (or equivalent to having similar coverage performance). To meet the first constraint condition and the second constraint condition described in the foregoing embodiment, a group of root indexes u and $N_{zc}-u$ that are placed adjacent to each other and that have a same cubic metric are placed in an order from the right side to the left side of the real timing location based on the directions of the offsets that are of the peaks of the power delay profiles and that are caused by the frequency offset. A root index order in each subgroup is fine-tuned, to ensure that $|du_1-du_2|>1$ can be met when root indexes are successively selected.

A mapping table that is shown in FIG. 7-A and FIG. 7-B and that is designed in this application is used, and an anti-frequency offset random access preamble generated by using two ZC sequences that are not conjugate to each other is used. For example, when indication is performed based on the third indication manner of the root indexes, the prach-RootSequenceIndex field of the SIB 1 message indicates a first logical root index used by $u_1$, for example, when an indicated value is i, a first logical root index used by $u_2$ is (i+2) by default. When the terminal cannot generate enough root indexes by using the $n^{th}$ logical root index, the terminal finds, based on a specific rule, a root index corresponding to a next logical root index to continuously generate the sequence parts. According to the mapping table shown in FIG. 7-A and FIG. 7-B and the foregoing indication manner, it can be ensured that the two ZC sequences whose root indexes are successively selected and that are included in the anti-frequency offset preamble meet: $2 \leq |du_1 - du_2| \leq 53$. This can ensure specific tolerance to an error of an actual detection point, can resist 16 normalized preamble subcarrier frequency offsets (based on a condition $ifo_{max} \cdot |du_1 - du_2| < N_{zc}$), and can meet an anti-frequency offset requirement of the satellite communication system.

FIG. 8-A shows an example of $d_u$ distribution in which the logical root indexes correspond to the physical root indexes in the mapping table that is shown in FIG. 7-A and FIG. 7-B and that is designed in this application.

FIG. 8-B shows an example of cubic metric distribution in which the logical root indexes correspond to the physical root indexes in the mapping table that is shown in FIG. 7-A and FIG. 7-B and that is designed in this application.

According to the root index transmission manner of the ZC sequences of the anti-frequency offset sequence part provided in the examples of this embodiment of this application, there are a plurality of transmission forms for root index transmission of the ZC sequences. Based on the basic design idea of the mapping table of the LTE/NR protocol, a logical root index-physical root index mapping table that is applicable to the anti-frequency offset preamble is re-designed. In combination with the first constraint condition and the second constraint condition, and a corresponding indication manner is selected, so that the terminal can select a root index in a simple manner, signaling overheads of the base station in indicating a logical root index are low, and the constraint conditions of the detection method and a system performance requirement can be further met.

It can be learned that because the anti-frequency offset random access preamble that is designed in this embodiment of this application and that includes a plurality of preamble symbols includes preamble symbols generated by using different ZC sequences, the sequence has a better anti-frequency offset capability. In addition, the sequence format is designed to meet a link budget requirement, and is compatible with a sequence part generation manner and most sequence part structures specified in the NR protocol. In addition, preamble symbols generated by using different ZC sequences may be further used for detection of a timing location greater than one preamble symbol length, and are applicable to a satellite cell of a larger range. These advantages meet main design requirements of the satellite communication system for the random access preamble sequence, where the main design requirements include a large coverage area, a good anti-frequency offset capability, and a link budget requirement.

With reference to the basic design of the anti-frequency offset random access preamble sequence, in this embodiment of this application, a selection manner of the root indexes of the ZC sequences for generating the anti-frequency offset random access preamble is further proposed, and a corresponding root index mapping table is designed. The selection manner of the root indexes and design of the root index mapping table enable the constraint conditions of the detection solution of the anti-frequency offset sequence part and the system performance requirement to be met with as little overheads as possible, so that an entire solution is more complete.

Refer to FIG. 9. An embodiment of this application provides a satellite communication device 900. The satellite communication device 900 may include:

a generation unit 910, configured to generate a random access preamble sequence, where the random access preamble sequence includes a cyclic prefix, a sequence part, and a guard interval;

the sequence part includes a subsequence A and a subsequence B, or the sequence part includes a subsequence C, and the subsequence C is a time domain superimposed sequence of a subsequence A and a subsequence B; and the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer; and an output unit 920, configured to output the random access preamble sequence.

It can be learned that in the solution of this embodiment of this application, a random access preamble sequence that includes a plurality of preamble symbols and that has an anti-frequency offset capability is designed, and the random access preamble sequence includes preamble symbols generated by using different ZC sequences. It is found in a test that the random access preamble sequence has a good anti-frequency offset capability.

A length of each subsequence A and a length of each subsequence B may be separately greater than or equal to a length of the cyclic prefix.

In some possible implementations, the random access preamble sequence includes one cyclic prefix. The subsequence A and the subsequence B are located between the cyclic prefix and the guard interval, or the subsequence C is located between the cyclic prefix and the guard interval.

In some other possible implementations, the random access preamble sequence includes a first cyclic prefix and a second cyclic prefix. At least one subsequence A is located between the first cyclic prefix and the second cyclic prefix, and at least one subsequence B is located between the second cyclic prefix and the guard interval.

Alternatively, at least one subsequence B is located between the first cyclic prefix and the second cyclic prefix, and at least one subsequence A is located between the second cyclic prefix and the guard interval.

Alternatively, at least one subsequence C is located between the first cyclic prefix and the second cyclic prefix, and at least one subsequence C is located between the second cyclic prefix and the guard interval.

Alternatively, at least one subsequence A and at least one subsequence B alternately occur between the first cyclic prefix and the second cyclic prefix.

A specific format for generating the random access preamble sequence is not limited to the foregoing examples, and another format that meets a requirement may be further designed based on the requirement.

In some possible implementations, the receiving unit is configured to: receive a root index indication before the generation unit generates the random access preamble sequence, where the root index indication is used to determine the root indexes of the ZC sequences used to generate the subsequence A and/or the subsequence B. The generation unit may determine, based on the root index indication, the root indexes of the ZC sequences used to generate the subsequence A and/or the subsequence B.

The root index indication may specifically determine, in various manners, the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1=f(i)$, $u_2=g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1=f(i_1)$, $u_2=f(i_2)$, and $f(\cdot)$ represents a mapping relationship that is between a logical root index and a physical root index and that is recorded in a mapping table.

Alternatively, the root index indication includes a first logical root index $i_1$ that can be used by the root index $u_1$, $u_1=f(i_1)$, $u_2=f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{zc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

Refer to FIG. 10. An embodiment of this application further provides a satellite communication device 1000, including:

a receiving unit 1010, configured to receive a random access preamble sequence; and a detection unit 1020, configured to detect the received random access preamble sequence by using a first detection window and a second detection window to generate two power delay profiles; and obtain an uplink timing advance by using a difference between locations of correlation peaks of the two power delay profiles.

The random access preamble sequence includes a cyclic prefix, a sequence part, and a guard interval; the sequence part includes a subsequence A and a subsequence B, or the sequence part includes a subsequence C, and the subsequence C is a time domain superimposed sequence of a subsequence A and a subsequence B; and the subsequence A includes at least one preamble symbol, the subsequence B includes at least one preamble symbol, the subsequence A and the subsequence B are respectively generated by using ZC sequences of different root indexes, a quantity of subsequences A is m, a quantity of subsequences B is m or m−1, and m is a positive integer.

In some possible implementations, that the detection unit obtains an uplink timing advance by using a difference between locations of correlation peaks of the two power delay profiles includes: obtaining possible values of normalized preamble subcarrier frequency offsets by using the difference between the locations of the correlation peaks of the two power delay profiles, and obtaining the uplink timing advance based on the possible values of the normalized preamble subcarrier frequency offsets.

For example, $$ifo_1 = \text{round}((peakidx_1 - peakidx_2) \bmod L/(d_{u1}-d_{u2}))$$

$$ifo_2 = \text{round}((peakidx_2 - peakidx_1) \bmod L/(d_{u2}-d_{u1}))$$

$$peakidx'_1 = peakidx_1 - ifo_1 \cdot d_{u1} \text{ or } peakidx_1 - ifo_2 \cdot d_{u1}$$

$$peakidx'_2 = peakidx_2 - ifo_1 \cdot d_{u2} \text{ or } peakidx_2 - ifo_2 \cdot d_{u2}$$

$ifo_1$ and $ifo_2$ represent the possible values of the normalized preamble subcarrier frequency offsets, $u_1$ is the root index of the ZC sequence used to generate the subsequence A, and $u_2$ is the root index of the ZC sequence used to generate the subsequence B.

L is a length of a power delay profile window.

$d_{u1}$ is a peak shift value that is of the ZC sequence with the root index $u_1$ and that is generated by one normalized preamble subcarrier frequency offset, and $d_{u2}$ is a peak shift value that is of the ZC sequence with the root index $u_2$ and that is generated by one normalized preamble subcarrier frequency offset.

$peakidx_1$ represents the location of the correlation peak of the power delay profile of the first detection window, and $peakidx_2$ represents the location of the correlation peak of the power delay profile of the second detection window.

A peak location corresponding to the uplink timing advance meets $peakidx=peakidx'_1=peakidx'_2$.

In some possible implementations, the root index $u_1$ and the root index $u_2$ meet a first constraint condition and a second constraint condition.

The first constraint condition $ifo_{max} \cdot |du_1-du_2|<\alpha$ or $2 \cdot ifo_{max} \cdot d_u < N_{zc}/2$.

The second constraint condition is that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \bmod N_{zc}=1$, $p_{u2}$ is a minimum non-negative integer that meets $(p_{u2}u_2) \bmod N_{zc}=1$, and both $p_{u1}$ and $p_{u2}$ are greater than $N_{zc}/2$ or both $p_{u1}$ and $p_{u2}$ are less than $N_{zc}/2$, where $$d_u = \begin{cases} p & 0 \le p < N_{ZC}/2 \\ N_{ZC} - p & \text{otherwise} \end{cases}$$

$\alpha$ represents a parameter limit, p is $p_{u1}$ or $p_{u2}$, and du is $d_{u1}$ or $d_{u2}$.

In some possible implementations, the root index $u_1$ and the root index $u_2$ meet a first constraint condition and a third constraint condition.

The first constraint condition is $ifo_{max} \cdot (d_{u1}+d_{u2})<\alpha$ or $2 \cdot ifo_{max} \cdot d_u < N_{zc}/2$.

The third constraint condition may be that the root indexes $u_1$ and $u_2$ meet $(p_{u1}u_1) \bmod N_{zc}=1$ and $(p_{u2}u_2) \bmod N_{zc}=1$, $p_{u1}$ is a minimum non-negative integer that meets $(p_{u1}u_1) \mod N_{zc}=1$, $p_{u2}$ is a minimum non-negative integer that meets $(p_{u2}u_2) \mod N_{zc}=1$, $p_{u2}$ is greater than $N_{zc}/2$, and $p_{u2}$ is less than $N_{zc}/2$. $\alpha$ represents a parameter limit.

In some possible implementations, the satellite communication device further includes a sending unit, configured to send a root index indication before the random access preamble sequence is received, where the root index indication is used to determine the root indexes of the ZC sequences used to generate the subsequence A and/or the subsequence B.

The root index indication may be carried in, for example, a prach-RootSequenceIndex field or another field of a system information block SIB 1 or another message.

For example, $u_1$ is the root index of the ZC sequence used to generate the subsequence A, and $u_2$ is the root index of the ZC sequence used to generate the subsequence B.

The root index indication includes first logical root indexes i that can be used by the root indexes $u_1$ and $u_2$, $u_1=f(i)$, $u_2=g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table.

Alternatively, the root index indication includes a first logical root index $i_1$ that can be used by the root index $u_1$ and a first logical root index $i_2$ that can be used by the root index $u_2$, $u_1=f(i_1)$, $u_2=f(i_2)$, and $f(\cdot)$ represents a mapping relationship that is between a logical root index and a physical root index and that is recorded in a mapping table.

Alternatively, the root index indication includes a first logical root index $i_1$ that can be used by the root index $u_1$, $u_1=f(i_1)$, $u_2=f(g(i_1))$, $f(\cdot)$ represents a mapping relationship that is between a logical root index and a physical root index and that is recorded in a mapping table, and $g(\cdot)$ represents a mapping relationship between the first logical root index $i_1$ that can be used by the root index $u_1$ and a first logical root index $i_2$ that can be used by the root index $u_2$.

Alternatively, the root index indication includes a first logical root index $i_1$ that can be used by the root index $u_1$, $(N_{zc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

Figure 11:
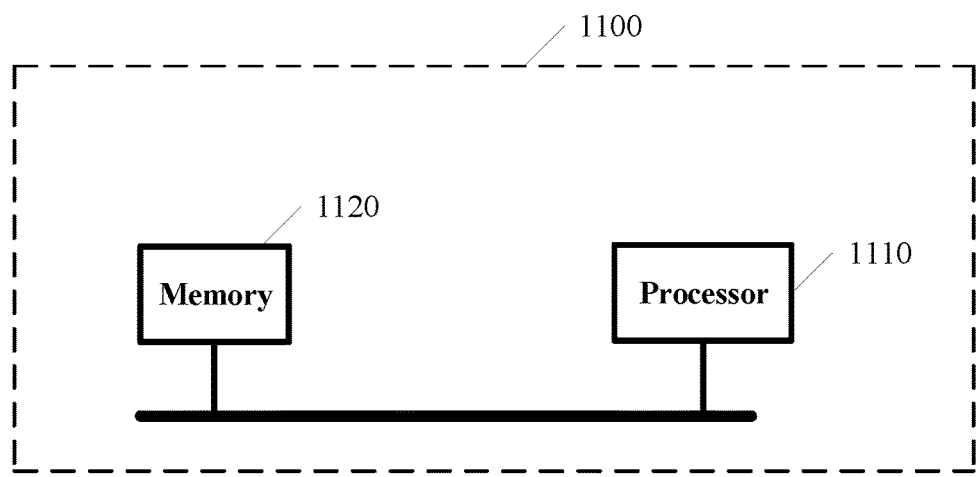
FIG. 11 is a schematic diagram of a structure of another satellite communication device according to an embodiment of this application.

Refer to FIG. 11. An embodiment of this application further provides a satellite communication device 1100 (a satellite communication device 1100, for example, a terminal device, a ground base station, or a satellite). The satellite communication device 1100 may include a processor 1110 and a memory 1120 that are coupled to each other. The processor is configured to invoke a computer program stored in the memory, to perform some or all of the steps of any method provided in embodiments of this application.

An embodiment of this application further provides a computer-readable storage medium, where the computer-readable storage medium stores a computer program, and the computer program is executed by a processor, to complete some or all of the steps of any method provided in embodiments of this application.

An embodiment of this application further provides a computer program product including instructions. When the computer program product runs on user equipment, a satellite communication device may be enabled to perform some or all of the steps of any method provided in embodiments of this application.

Figure 12:
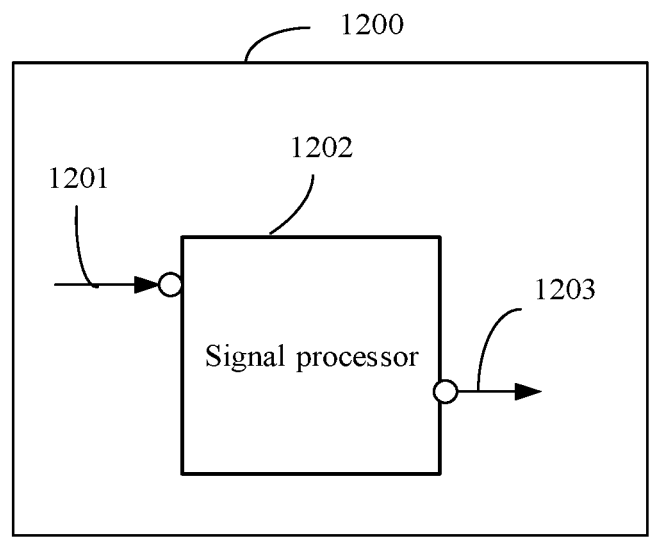
FIG. 12 is a schematic diagram of a structure of another satellite communication device according to an embodiment of this application.

Refer to FIG. 12. An embodiment of this application further provides a communication apparatus 1200, including an input interface circuit 1201, a signal processor 1202, and an output interface circuit 1203. The signal processor 1202 is configured to perform some or all of the steps of any method provided in embodiments of this application.

Figure 13:
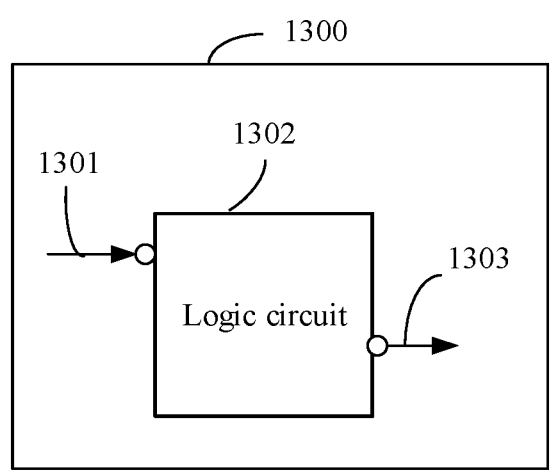
FIG. 13 is a schematic diagram of a structure of another satellite communication device according to an embodiment of this application.

Refer FIG. 13. An embodiment of this application further provides a communication apparatus 1300, including at least one input end 1301, a logic circuit 1302, and at least one output end 1303. The logic circuit 1302 is configured to perform some or all of the steps of any method provided in embodiments of this application.

An embodiment of this application further provides a computer-readable storage medium. The computer-readable storage medium stores a computer program, and the computer program is executed by hardware (for example, a processor), to perform some or all of the steps of any method performed by any device in embodiments of this application.

An embodiment of this application further provides a computer program product including instructions. When the computer program product runs on a computer device, the computer device is enabled to perform some or all of the steps of any method in the foregoing aspects.

All or some of the foregoing embodiments may be implemented by using software, hardware, firmware, or any combination thereof. When software is used to implement embodiments, embodiments may be implemented all or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the description of each embodiment has respective focuses. For a part that is not described in detail in an embodiment, refer to related descriptions in other embodiments.

In the foregoing embodiments, the description of each embodiment has respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located in one position or may be distributed on a plurality of network units. Some or all of the units may be selected based on actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in the form of a software product. The software product is stored in a storage medium and includes several instructions for instructing a computer device (which may be a personal computer, a server, a network device, or the like) to perform all or some of the steps of the methods described in embodiments of this application. The foregoing storage medium may include, for example, any medium that can store program code, such as a USB flash drive, a removable hard disk, a read-only memory (ROM), a random access memory (RAM), a magnetic disk, or an optical disc.

What is claimed is:

1. A satellite communication method, comprising:
generating a random access preamble sequence, wherein the random access preamble sequence comprises a cyclic prefix, a sequence part, and a guard interval, wherein the sequence part comprises a subsequence A and a subsequence B, or the sequence part comprises a subsequence C which is a time domain superimposed sequence of a subsequence A and a subsequence B, and wherein the subsequence A and the subsequence B each comprising at least one preamble symbol, the subsequence A and the subsequence B are respectively generated by using ZC sequences of different root indexes, a quantity of subsequences A is m, a quantity of subsequences B is m or m−1, and m is a positive integer; and
outputting the random access preamble sequence.

2. The method according to claim 1, wherein a length of each subsequence A and a length of each subsequence B are separately greater than or equal to a length of the cyclic prefix.

3. The method according to claim 1, wherein the random access preamble sequence comprises one cyclic prefix; and
the subsequence A and the subsequence B are located between the cyclic prefix and the guard interval, or
the subsequence C is located between the cyclic prefix and the guard interval.

4. The method according to claim 1, wherein the random access preamble sequence comprises a first cyclic prefix and a second cyclic prefix, and the method further comprises:
at least one subsequence A is located between the first cyclic prefix and the second cyclic prefix, and at least one subsequence B is located between the second cyclic prefix and the guard interval;
at least one subsequence B is located between the first cyclic prefix and the second cyclic prefix, and at least one subsequence A is located between the second cyclic prefix and the guard interval;
at least one subsequence C is located between the first cyclic prefix and the second cyclic prefix, and at least one subsequence C is located between the second cyclic prefix and the guard interval; or
at least one subsequence A and at least one subsequence B alternately occur between the first cyclic prefix and the second cyclic prefix.

5. The method according to claim 1, wherein before generating the random access preamble sequence, the method further comprises:
receiving a root index indication, wherein the root index indication is configured to determine root indexes of the ZC sequences for generating at least one of the subsequence A or the subsequence B.

6. The method according to claim 5, wherein
the root index indication is carried in a prach-RootSequenceIndex field of a system information block SIB 1, wherein $u_1$ is a root index of a ZC sequence used to generate the subsequence A and $u_2$ is a root index of the ZC sequence used to generate the subsequence B, and wherein the root index indication comprises:
a first logical root indexes i used by root indexes $u_1$, and $u_2$, $u_1=f(i)$, $u_2=g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table;
the root index indication comprises a first logical root index $i_1$ used by the root index $u_1$, and a first logical root index $i_2$ used by the root index $u_2$, $u_1=f(i_1)$, $u_2=f(i_2)$, and $f(\cdot)$ represents a mapping relationship that is between a logical root index and a physical root index and that is recorded in a mapping table;
a first logical root index it used by the root index $u_1$, $u_1=f(i_1)$, $u_2=f(g(i_1))$, and $f(\cdot)$ represents a mapping relationship that is between a logical root index and a physical root index and that is recorded in a mapping table; or
first logical root index is used by the root index $u_1$, $(N_{zc}-u_1)=f(i_1+1)$, $u_1=f(i_1)$, the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

7. A satellite communication method, comprising:
receiving a random access preamble sequence; and
detecting the received random access preamble sequence by using a first detection window and a second detection window to generate two power delay profiles, wherein the random access preamble sequence comprises a cyclic prefix, a sequence part, and a guard interval, wherein the sequence part comprises a subsequence A and a subsequence B, or the sequence part comprises a subsequence C which is a time domain superimposed sequence of a subsequence A and a subsequence B, and wherein the subsequence A and the subsequence B each comprising at least one preamble symbol, the subsequence A and the subsequence B are respectively generated by using ZC sequences of different root indexes, a quantity of subsequences A is m, a quantity of subsequences B is m or m−1, and m is a positive integer; and obtaining an uplink timing advance by using a difference between locations of correlation peaks of the two power delay profiles.

8. The method according to claim 7, wherein the random access preamble sequence comprises one cyclic prefix; and
the subsequence A and the subsequence B are located between the cyclic prefix and the guard interval, or
the subsequence C is located between the cyclic prefix and the guard interval.

9. The method according to claim 7, wherein the random access preamble sequence comprises a first cyclic prefix and a second cyclic prefix, and the method further comprises:
at least one subsequence A is located between the first cyclic prefix and the second cyclic prefix, and at least one subsequence B is located between the second cyclic prefix and the guard interval;
at least one subsequence B is located between the first cyclic prefix and the second cyclic prefix, and at least one subsequence A is located between the second cyclic prefix and the guard interval;
at least one subsequence C is located between the first cyclic prefix and the second cyclic prefix, and at least one subsequence C is located between the second cyclic prefix and the guard interval; or
at least one subsequence A and at least one subsequence B alternately occur between the first cyclic prefix and the second cyclic prefix.

10. The method according to claim 7, wherein obtaining the uplink timing advance by using the difference between the locations of correlation peaks of the two power delay profiles spectra comprises:
obtaining possible values of normalized preamble subcarrier frequency offsets by using the difference between the locations of correlation peaks of the two power delay profiles; and
calculating actual peak location based on the possible values of normalized preamble subcarrier frequency offsets.

11. The method according to claim 10, wherein $ifo_1 = \text{round}((\text{peakidx}_1 - \text{peakidx}_2) \bmod L/(d_{u1} - d_{u2}))$ $ifo_2 = \text{round}((\text{peakidx}_2 - \text{peakidx}_1) \bmod L/(d_{u2} - d_{u1}))$ $\text{peakidx}'_1 = \text{peakidx}_1 - ifo_1 \cdot d_{u1}$ or $\text{peakidx}_1 - ifo_2 \cdot d_{u1}$ $\text{peakidx}'_2 = \text{peakidx}_2 - ifo_1 \cdot d_{u2}$ or $\text{peakidx}_2 - ifo_2 \cdot d_{u2}$, where $ifo_1$ and $ifo_2$ and represent the possible values of normalized preamble subcarrier frequency offsets, $u_1$ is a root index of a ZC sequence used to generate the subsequence A, and $u_2$ is a root index of the ZC sequence used to generate the subsequence B;
L is a length of a power delay profile window;
$d_{u1}$ is a peak shift value that is of the ZC sequence with the root index $u_1$, and that is generated by one normalized preamble subcarrier frequency offset, and $d_{u2}$ is a peak shift value that is of the ZC sequence with the root index $u_2$ and that is generated by one normalized preamble subcarrier frequency offset;
$\text{peakidx}_1$ represents a location of correlation peak of a power delay profile of the first detection window, and
$\text{peakidx}_2$ represents a location of correlation peak of a power delay profile of the second detection window; and
a peak location corresponding to the uplink timing advance meets $\text{peakidx} = \text{peakidx}'_1 = \text{peakidx}'_2$.

12. The method according to claim 11, wherein the root index $u_1$ and the root index $u_2$ meet a first constraint condition and a second constraint condition;
the first constraint condition is $ifo_{max} \cdot |du_1 - du_2| < \alpha$ or $2 \cdot ifo_{max} \cdot d_u < N_{zc}/2$; and
the second constraint condition is that root indexes $u_1$ and $u_2$ meet $(p_{u1}u_1) \bmod N_{zc} = 1$ and $(p_{u2}u_2) \bmod N_{zc} = 1$, $p_{u1}$ is a minimum non-negative integer that meets $(p_{u1}u_1) \bmod N_{zc} = 1$, $p_{u2}$ is a minimum non-negative integer that meets $(p_{u2}u_2) \bmod N_{zc} = 1$, and both $p_{u1}$ and $p_{u2}$ are greater than $N_{zc}/2$ or both $p_{u1}$ and $p_{u2}$ are less than $N_{zc}/2$, wherein $$d_u = \begin{cases} p & 0 \le p < N_{ZC}/2 \\ N_{ZC} - p & \text{otherwise} \end{cases},$$

and
$\alpha$ represents a parameter limit, p is $p_{u1}$ or $p_{u2}$, and $d_u$ is $d_{u1}$ or $d_{u2}$.

13. The method according to claim 11, wherein the root index $u_1$ and the root index $u_2$ meet a first constraint condition and a third constraint condition;
the first constraint condition is $ifo_{max} \cdot d_{u1} + d_{u2}) < \alpha$ or $2 \cdot ifo_{max} \cdot d_u < N_{zc}/2$; and
the third constraint condition is that root indexes $u_1$ and $u_2$ meet $(p_{u1}u_1) \bmod N_{zc} = 1$ and $(p_{u2}u_2) \bmod N_{zc} = 1$, put is a minimum non-negative integer that meets $(p_{u1}u_1) \bmod N_{zc} = 1$, $p_{u2}$ is a minimum non-negative integer that meets $(p_{u2}u_2) \bmod N_{zc} = 1$, $p_{u1}$ is greater than $N_{zc}/2$, and $p_{u2}$ is less than $N_{zc}/2$, wherein
$\alpha$ represents a parameter limit.

14. The method according to claim 7, wherein before receiving the random access preamble sequence, the method further comprises:
sending a root index indication, wherein the root index indication is configured to determine root indexes of the ZC sequences for generating at least one of the subsequence A or the subsequence B.

15. The method according to claim 14, wherein
the root index indication is carried in a prach-RootSequenceIndex field of a system information block SIB 1, wherein $u_1$ is a root index of a ZC sequence used to generate the subsequence A and $u_2$ is a root index of the ZC sequence used to generate the subsequence B, and wherein the root index indication comprises:
a first logical root indexes i used by root indexes $u_1$ and $u_2$, $u_1 = f(i)$, $u_2 = g(i)$, $f(\cdot)$ represents a mapping relationship that is between a logical root index and a physical root index and that is recorded in a first mapping table, and $g(\cdot)$ represents a mapping relationship that is between a logical root index and a physical root index and that is recorded in a second mapping table;
a first logical root index $i_1$ used by the root index $u_1$ and a first logical root index $i_2$ used by the root index $u_2$, $u_1 = f(i_1)$, $u_2 = f(i_2)$, and $f(\cdot)$ represents a mapping relationship that is between a logical root index and a physical root index and that is recorded in a mapping table;

a first logical root index $i_1$ used by the root index $u_1$, $u_1=f(i_1)$, $u_2=f(g(i_1))$, and $f(\cdot)$ represents a mapping relationship that is between a logical root index and a physical root index and that is recorded in a mapping table; or a first logical root index $i_1$ used by the root index $u_1$, $(N_{zc}-u_1)=f(i_1+1)$, $u_1=f(i_1)$ the ZC sequences used respectively to generate the subsequence A and the subsequence B are ZC sequences conjugate to each other, and $f(\cdot)$ represents a mapping relationship that is between a logical root index and a physical root index and that is recorded in a mapping table.

16. A terminal device, comprising:
at least one processor; and
one or more memories including computer-executable instructions that, when executed by the at least one processor, cause the terminal device to:
generate a random access preamble sequence, wherein the random access preamble sequence comprises a cyclic prefix, a sequence part, and a guard interval, wherein the sequence part comprises a subsequence A and a subsequence B, or the sequence part comprises a subsequence C which is a time domain superimposed sequence of a subsequence A and a subsequence B, and wherein the subsequence A and the subsequence B each comprising at least one preamble symbol, the subsequence A and the subsequence B are respectively generated by using ZC sequences of different root indexes, a quantity of subsequences A is m, a quantity of subsequences B is m or m−1, and m is a positive integer; and
output the random access preamble sequence.

17. The terminal device according to claim 16, wherein a length of each subsequence A and a length of each subsequence B are separately greater than or equal to a length of the cyclic prefix.

18. The terminal device according to claim 16, wherein the random access preamble sequence comprises one cyclic prefix; and
the subsequence A and the subsequence B are located between the cyclic prefix and the guard interval, or
the subsequence C is located between the cyclic prefix and the guard interval.

19. The terminal device according to claim 16, wherein the random access preamble sequence comprises a first cyclic prefix and a second cyclic prefix, and further comprises:
at least one subsequence A is located between the first cyclic prefix and the second cyclic prefix, and at least one subsequence B is located between the second cyclic prefix and the guard interval;
at least one subsequence B is located between the first cyclic prefix and the second cyclic prefix, and at least one subsequence A is located between the second cyclic prefix and the guard interval;
at least one subsequence C is located between the first cyclic prefix and the second cyclic prefix, and at least one subsequence C is located between the second cyclic prefix and the guard interval; or
at least one subsequence A and at least one subsequence B alternately occur between the first cyclic prefix and the second cyclic prefix.

20. The terminal device according to claim 16, wherein, the computer-executable instructions, when executed by the at least one processor, further cause the terminal device to:
receive a root index indication before generating a random access preamble sequence, wherein the root index indication is configured to determine root indexes of the ZC sequences for generating at least one of the subsequence A or the subsequence B.

* * * * *

UNITED STATES PATENT AND TRADEMARK OFFICE
CERTIFICATE OF CORRECTION

| | | |
|---|---|---|
| PATENT NO. | : 12,047,158 B2 | Page 1 of 1 |
| APPLICATION NO. | : 17/707558 | |
| DATED | : July 23, 2024 | |
| INVENTOR(S) | : Chenlei Xu et al. | |

It is certified that error appears in the above-identified patent and that said Letters Patent is hereby corrected as shown below:

In the Claims

In Column 32, In Line 28, In Claim 6, delete "$u_1$," and insert -- $u_1$ --.

In Column 32, In Line 36, In Claim 6, before "a first" delete "the root index indication comprises".

In Column 32, In Line 37, In Claim 6, delete "$u_1$," and insert -- $u_1$ --.

In Column 32, In Line 42, In Claim 6, delete "it" and insert -- $i_1$ --.

In Column 32, In Line 47, In Claim 6, before "first" insert -- a --.

In Column 32, In Line 47, In Claim 6, delete "is" and insert -- $i_1$ --.

In Column 33, In Line 35, In Claim 10, before "comprises:" delete "spectra".

In Column 33, In Line 61, In Claim 11, delete "$u_1$," and insert -- $u_1$ --.

In Column 34, In Line 31, In Claim 13, delete "$ifo_{max} \cdot d_{u1}+d_{u2})<\alpha$" and insert -- $ifo_{max} \cdot (d_{u1}+d_{u2})<\alpha$ --.

In Column 34, In Line 34, In Claim 13, delete "put" and insert -- $p_{u1}$ --.

In Column 35, In Line 7, In Claim 15, delete "($N_{zc}=-u_1$)" and insert -- ($N_{zc}-u_1$) --.

In Column 35, In Line 7, In Claim 15, after "$u_1=f(i_1)$" insert -- , --.

Signed and Sealed this
Fifth Day of November, 2024

Katherine Kelly Vidal
*Director of the United States Patent and Trademark Office*